United States Patent
Yamagishi

(10) Patent No.: US 8,441,571 B2
(45) Date of Patent: May 14, 2013

(54) IMAGE SENSING APPARATUS HAVING A POWER SAVING MODE AND CONTROL METHOD THEREFOR

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 11/530,993

(22) Filed: Sep. 12, 2006

(65) Prior Publication Data

US 2007/0058074 A1 Mar. 15, 2007

(30) Foreign Application Priority Data

Sep. 13, 2005 (JP) ................................ 2005-265946

(51) Int. Cl.
*H04N 5/225* (2006.01)
*H04B 1/38* (2006.01)

(52) U.S. Cl.
USPC .......................................... 348/372; 455/572

(58) Field of Classification Search .............. 348/372, 348/374; 455/127.5, 127.1, 522, 572–574; 713/320, 323
See application file for complete search history.

(56) References Cited

U.S. PATENT DOCUMENTS

| 4,928,137 | A | * | 5/1990 | Kinoshita | 348/297 |
| 5,636,315 | A | * | 6/1997 | Sugiyama et al. | 386/46 |
| 5,832,285 | A |  | 11/1998 | Shimada |  |
| 6,104,886 | A | * | 8/2000 | Suzuki et al. | 396/429 |
| 6,412,076 | B1 | * | 6/2002 | Honda et al. | 713/323 |
| 6,670,933 | B1 | * | 12/2003 | Yamazaki | 345/1.1 |
| 6,809,759 | B1 | * | 10/2004 | Chiang | 348/211.2 |
| 6,993,357 | B1 | * | 1/2006 | Ito et al. | 455/552.1 |
| 7,000,129 | B2 |  | 2/2006 | Sekine et al. |  |
| 7,084,921 | B1 |  | 8/2006 | Ogawa |  |
| 7,221,391 | B2 |  | 5/2007 | Yamagishi |  |
| 2002/0068618 | A1 | * | 6/2002 | Shoobridge | 455/574 |
| 2003/0071912 | A1 | * | 4/2003 | Minakuti | 348/372 |
| 2007/0004467 | A1 | * | 1/2007 | Chary | 455/572 |

FOREIGN PATENT DOCUMENTS

| JP | 2892963 | 2/1999 |
| JP | 11-088744 | 3/1999 |
| JP | 11-205645 | 7/1999 |
| JP | 2000-66774 | 3/2000 |
| JP | 2000-299834 | 10/2000 |
| JP | 2003-131771 | 5/2003 |
| JP | 2005-167634 | 6/2005 |

OTHER PUBLICATIONS

Japanese Office Action dated Oct. 15, 2010, in Japanese Application No. 2005-265946.

* cited by examiner

*Primary Examiner* — Aung S Moe
*Assistant Examiner* — Mekonnen Dagnew
(74) *Attorney, Agent, or Firm* — Fitzpatrick, Cella, Harper & Scinto

(57) ABSTRACT

A control method for an image sensing apparatus is provided with an operation unit for receiving input from a user and a communication unit for communicating with an external processing device, and having a power saving mode for stopping the supply of electrical power to at least a part of the image sensing apparatus if no input to the operation unit is performed for a predetermined time period is disclosed. The control method selects one of a plurality of operation modes including at least image sensing mode and playback mode, and controls a shift to the power saving mode depending on the selected operation mode and a state of communication with the external processing apparatus using the communication unit.

14 Claims, 26 Drawing Sheets

IMAGE SENSING APPARATUS HAVING A POWER SAVING MODE AND CONTROL METHOD THEREFOR

BACKGROUND OF THE INVENTION

1. Field of the Invention

The present invention relates to an image sensing apparatus that senses still images and moving images and can store, communicate, record and playback the sensed images, and a control method for the image sensing apparatus.

2. Description of the Related Art

Conventionally, an image sensing apparatus such as an electronic camera, which uses a memory card having solid-state memory elements as a recording medium and records and plays back still images and moving images, is already available commercially. Furthermore, a portable printer that prints images and an image processing apparatus such as a personal computer that communicates/stores audio data and video data are also available commercially.

By making portable an image sensing system composed of such electronic cameras and printers, and/or personal computers, it has become possible to work expeditiously outdoors, without being limited to indoor environments such as a home or an office.

In particular, the electronic camera and printer and/or personal computer can be made to work together, to transfer image data sensed using an electronic camera provided with a communication function to a printer provided with a communication function for printing, transfer to a personal computer provided with a communication function using wireless communication, and the like. Conversely, the electronic camera and the personal computer can also be made to work together by being provided with the function to control the electronic camera remotely from the personal computer and sense images or the like, so that it is possible to build a very convenient image sensing system.

In addition, some image sensing apparatuses such as electronic cameras are provided with an auto power off function or similar power saving function, in that power for the electronic camera is automatically turned off after a predetermined period of time has elapsed and the camera has not been operated, the display on a display unit is cut off, and so forth. This function makes it possible to extend the battery drive time of an image sensing apparatus such as the electronic camera.

However, this type of conventional image sensing system composed of an electronic camera and printer and/or personal computer has the following problems. Specifically, when transferring image data sensed with an electronic camera to a printer, if the electronic camera is not operated for a predetermined period of time, the auto power off or other such power saving function operates, which, in turn, interrupts the transfer process during even those operations in which the transfer process should not be stopped.

By contrast, turning off the auto power off or other such power saving function does prevent stoppage of the transfer process due to the power saving function. However, because the power saving function is not executed even during those operations in which the power saving function should be executed and power saved, it is not possible to extend the battery drive time of the electronic camera.

It is also possible to disable the power saving function when transferring image data and then turn the power saving function back on after transfer ends. However, because the power saving function must be turned off and then turned back on every time image data is transferred, operation of the system is inconvenient, and furthermore, one might forget to turn off the power saving function or to turn the power saving function back on, or forget whether the auto power off is currently turned on or turned off.

In addition, when transferring image data between the electronic camera and the printer, the communication link is sometimes broken due to a poor radio environment. In this case, not only can the image data not be transferred, but because the power saving function is not executed until a predetermined period of time elapses, the electronic camera battery is wasted.

In addition, when transferring image data between the electronic camera and the printer, if the radio environment happens to be poor the data transfer rate is decreased when communication is carried out. At this time, since the image data transfer time is lengthened, sometimes the auto power off or other such power saving function operates even when transfer has not ended, and in such cases, the transfer process is cut off even during the transfer process which should not be stopped.

SUMMARY OF THE INVENTION

The present invention has been made in consideration of the above-described situation, and has as its object to make the electronic camera not enter a power saving mode while data is being transferred to an external apparatus from the electronic camera without distracting the user, while still implementing power saving in the electronic camera.

According to the present invention, the foregoing object is obtained by providing an image sensing apparatus provided with an operation unit for receiving input from a user and having a power saving mode for stopping the supply of electrical power to at least a part of the image sensing apparatus if no input to the operation unit is performed for a predetermined time period, the image sensing apparatus comprising:

a communication unit for communicating with an external processing apparatus;

an operation mode selection unit that selects one of a plurality of operation modes including at least an image sensing mode and a playback mode; and a control unit that controls a shift to the power saving mode depending on an operation mode selected by the operation mode selection unit and a state of communication with the external processing apparatus using the communication unit.

According to the present invention, the foregoing object is also attained by providing a control method for an image sensing apparatus provided with an operation unit for receiving input from a user and a communication unit for communicating with an external processing device, and having a power saving mode for stopping the supply of electrical power to at least a part of the image sensing apparatus if no input to the operation unit is performed for a predetermined time period, the control method comprising:

an operation mode selection step of selecting one of a plurality of operation modes including at least an image sensing mode and a playback mode; and a control step of controlling a shift to the power saving mode depending on an operation mode selected in the operation mode selection step and a state of communication with the external processing apparatus using the communication unit.

Further, the foregoing object is also attained by providing an image sensing apparatus provided with an operation unit for receiving input from a user and having a power saving mode for stopping the supply of electrical power to at least a part of the image sensing apparatus if no input to the operation unit is performed for a predetermined time period, the image sensing apparatus comprising:
 a communication unit for communicating with an external processing apparatus;
 an operation mode selection unit that selects one of a plurality of operation modes including at least an image sensing mode and a playback mode;
 a determination unit that determines a state of a communication path during communication with the external processing apparatus using the communication unit; and
 a control unit that controls a shift to the power saving mode depending on an operation mode selected by the operation mode selection unit, a state of communication with the external processing apparatus using the communication unit, and the state of the communication path.

Furthermore, the foregoing object is also attained by providing a control method for an image sensing apparatus provided with an operation unit for receiving input from a user and a communication unit for communicating with an external processing device, and having a power saving mode for stopping the supply of electrical power to at least a part of the image sensing apparatus if no input to the operation unit is performed for a predetermined time period, the control method comprising:
 an operation mode selection step of selecting one of a plurality of operation modes including at least image sensing mode and playback mode; and
 a determination step of determining a state of a communication path during communication with the external processing apparatus using the communication unit; and
 a control step of controlling a shift to the power saving mode depending on an operation mode selected in the operation mode selection step, a state of communication with the external processing apparatus using the communication unit, and the state of the communication path.

Further, the foregoing object is also attained by providing an image sensing apparatus provided with an operation unit for receiving input from a user and having a power saving mode for stopping the supply of electrical power to at least a part of the image sensing apparatus if no input to the operation unit is performed for a predetermined time period, the image sensing apparatus comprising:
 a communication unit for communicating with an external processing apparatus;
 a determination unit that determines a state of a communication path during communication with the external processing apparatus using the communication unit; and
 an extension unit that changes the predetermined time period to be longer if results of a determination by the determination unit indicate that the state of the communication path is worse than a predetermined state than a case where the state of communication path is better than the predetermined state.

Further, the foregoing object is also attained by providing a control method for an image sensing apparatus provided with an operation unit for receiving input from a user and a communication unit for communicating with an external processing device, and having a power saving mode for stopping the supply of electrical power to at least a part of the image sensing apparatus if no input to the operation unit is performed for a predetermined time period, the control method comprising:
 a determination step of determining a state of a communication path during communication with the external processing apparatus using the communication unit; and
 an extension step of changing the predetermined time period to be longer if results of a determination in the determination step indicate that the state of the communication path is worse than a predetermined state than a case where the state of communication path is better than the predetermined state.

Further, the foregoing object is also attained by providing an image sensing apparatus provided with an operation unit for receiving input from a user and having a power saving mode for stopping the supply of electrical power to at least a part of the image sensing apparatus if no input to the operation unit is performed for a predetermined time period, the image sensing apparatus comprising:
 a communication unit for communicating with an external processing apparatus;
 an operation mode selection unit that selects one of a plurality of operation modes including at least an image sensing mode and a playback mode;
 a recording unit that records sensed image data;
 a determination unit that determines whether or not the recording unit is available; and
 a control unit that shifts the image sensing apparatus to the power saving mode depending on an operation mode selected by the operation mode selection unit, a state of communication with the external processing apparatus using the communication unit, and result of determination by the determination unit.

Further, the foregoing object is also attained by providing a control method for an image sensing apparatus provided with an operation unit for receiving input from a user and a communication unit for communicating with an external processing device, and having a power saving mode for stopping supply of electrical power to at least a part of the image sensing apparatus if no input to the operation unit is performed for a predetermined time period, the control method comprising:
 an operation mode selection step of selecting one of a plurality of operation modes including at least image sensing mode and playback mode;
 a recording step of recording sensed image data on a recording unit;
 a determination step of determining whether or not the recording unit is available; and
 a control step of shifting the image sensing apparatus to the power saving mode depending on an operation mode selected in the operation mode selection step, a state of communication with the external processing apparatus using the communication unit, and result of determination in the determination step.

Further features of the present invention will become apparent from the following description of exemplary embodiments (with reference to the attached drawings).

DESCRIPTION OF THE EMBODIMENTS

Preferred embodiments of the present invention will now be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
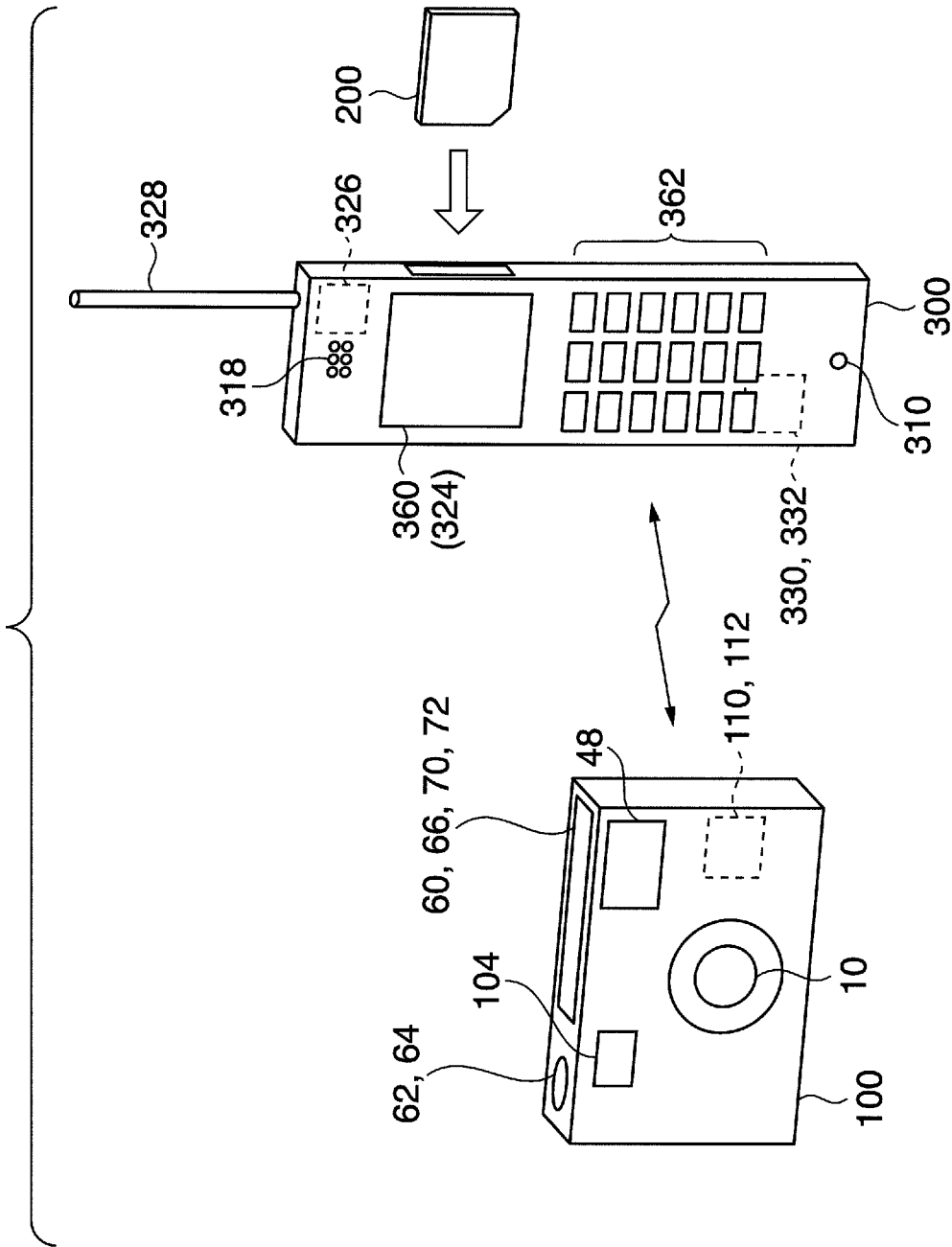
FIG. 1 is a diagram showing the configuration of a system according to a first embodiment of the present invention.

FIG. 1 is a diagram showing the overall configuration of a system of a first embodiment of the present invention.

In FIG. 1, reference numeral 100 denotes an image sensing apparatus, 200 denotes a recording medium and 300 denotes an image processing apparatus.

The image sensing apparatus 100 and the image processing apparatus 300 wirelessly exchange data, including commands and sensed images, the image sensing apparatus 100 doing so through a communication circuit 110 and an antenna 112 and the image processing apparatus 300 doing so through a communication circuit 330 and an antenna 332.

The wireless communication between the image sensing apparatus 100 and the image processing apparatus 300 is accomplished using wireless LAN communication using, for example, IEEE802.11b or IEEE802.11g protocols, by a spread spectrum scheme such as Bluetooth, or the like.

The image sensing apparatus 100 transmits image data sensed through a lens 10 to the image processing apparatus 300 over the communication circuit 110, the antenna 112, the antenna 332 and the communication circuit 330. The image processing apparatus 300 can record the image data received by a removable recording medium 200 as well as transmit the image data to another image processing apparatus 300 or to a communication base station over a communication circuit 326 and an antenna 328.

(Configuration of the Image Sensing Apparatus 100)

Figure 2:
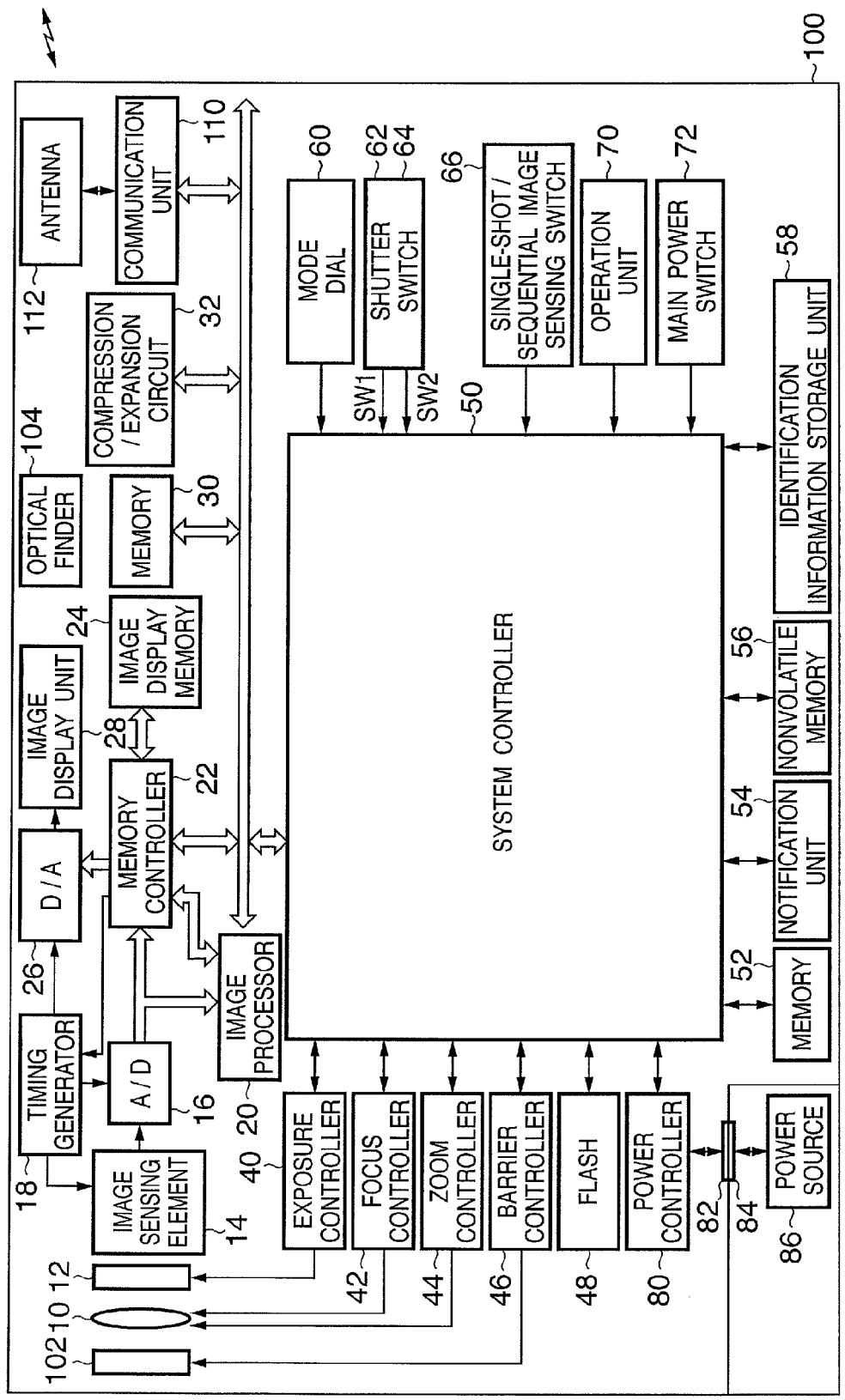
FIG. 2 is a block diagram showing the configuration of an image sensing apparatus according to the first embodiment of the present invention.

FIG. 2 is a block diagram showing a configuration of the image sensing apparatus 100 according to the first embodiment of the present invention. The image sensing apparatus 100 may be any of a digital camera, a digital video camera, a mobile terminal provided with a camera (including a mobile phone with a camera), and so on.

In FIG. 2, reference numeral 10 denotes an image sensing lens; 12, a shutter having a diaphragm function; reference numeral 14 denotes an image sensing element that converts an optical image into an electric signal; and reference numeral 16 denotes an A/D converter that converts an analog signal output from the image sensing element 14 into a digital signal.

Reference numeral 18 denotes a timing generator which supplies a clock signal and a control signal respectively to the image sensing element 14, the A/D converter 16 and a D/A converter 26, under the control of a memory controller 22 and a system controller 50.

Reference numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a focus controller 42, based on the result obtained by the calculations. Further, the image processor 20 performs predetermined calculations using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Reference numeral 24 denotes an image display memory; reference numeral 26 denotes the D/A converter; and reference numeral 28 denotes an image display unit comprising a TFT LCD (Thin-Film Transistor Liquid Crystal Display) or the like. Image data for display written into the image display memory 24 is displayed on the image display unit 28 via the D/A converter 26. An electronic view finder (EVF) function can be achieved by sequentially displaying obtained images on the image display unit 28. Further, the image display unit 28 arbitrarily turns ON/OFF its display, in accordance with an instruction from the system controller 50. If the display is turned OFF, the electrical power consumption of the image sensing apparatus 100 can be greatly reduced.

The memory 30 comprises a volatile memory or a nonvolatile memory for storing sensed still images and moving images, and has sufficient storage capacity to store a predetermined number of still images and a moving image for a predetermined period. In sequential image sensing to sequentially obtain a plural number of still images or panoramic image sensing, a large amount of image data can be written into the memory 30 at a high speed. Further, the memory 30 may be used as a work area for the system controller 50.

The compression/expansion circuit 32 compresses or expands image data using a known compression method, such as adaptive discrete cosine transformation (ADCT) or the like. The compression/expansion circuit 32 reads image data stored in the memory 30 and performs compression or expansion processing on the read image data, and writes the processed data into the memory 30.

Reference numeral 40 denotes an exposure controller, which controls the shutter 12 having the diaphragm function. The exposure controller 40 interlocked with a flash 48 also has a flash adjusting function. The focus controller 42 controls focusing of the image sensing lens 10. Reference numeral 44 denotes a zoom controller that controls zooming of the image sensing lens 10 and reference numeral 46 denote a barrier controller that controls the operation of a barrier 102 to protect the lens. The flash 48 has an AF auxiliary light projection function and a flash adjusting function. The exposure controller 40 and the focus controller 42 are controlled using a TTL system. As described above, the system controller 50 controls the exposure controller 40 and the focus controller 42 based on the result of calculations by the image processor 20 using the image data from the A/D converter 16.

The system controller 50 controls the overall image sensing apparatus 100. A memory 52 stores the constants, variables, and programs for the operation of the system controller 50.

Reference numeral 54 denotes a notification unit, which reports operating statuses, messages and the like to the outside by using characters, images, sound and the like, in response to the execution of the program by the system controller 50. The notification unit 54 comprises one or more combinations of display devices including an LCD and an LED for visual notification and sound generating devices for audio notification. Especially, the display device or devices is/are provided in one or more visually-recognizable positions around an operation unit 70 of the image sensing apparatus 100. Further, some of the functions of the notification unit 54 are provided within an optical finder 104.

The display contents of the notification unit 54, displayed on the LCD or the like, include an indication relating to image sensing, such as single shot/sequential image sensing, and a self timer, relating to recording, such as a compression rate, the number of recording pixels, the number of recorded images, and the number of recordable images, relating to image sensing conditions, such as a shutter speed, an f number (aperture), exposure compensation, flash illumination, and red-eye effect mitigation. Other than above, macro image sensing, a buzzer-set state, a timer battery level, a battery level, an error state, information of plural digit numbers, operation of communication I/F, and date and time may be also displayed.

Further, the display contents of the notification unit 54, displayed within the optical finder 104, include a focus state, a camera shake warning, a flash charge state, the shutter speed, the f number (aperture), and the exposure compensation.

Reference numeral 56 denotes an electrically erasable and recordable nonvolatile memory such as an EEPROM.

Reference numeral 58 denotes an identification information storage unit that stores a variety of identification information for carrying out authentication prior to communication when communicating with the image processing apparatus 300 through the communication circuit 110 and the antenna 112. It should be noted that the identification information storage unit 58 may be configured as a part of the nonvolatile memory 56 or another memory.

Reference numerals 60, 62, 64, 66, 70 and 72 denote operation means for inputting various operation instructions to the system controller 50, comprising a single or a plurality of combinations of switches, dials, touch panels, a device for pointing by line-of-sight detection, a voice recognition device, and the like.

Next, the operation means will be described in greater detail.

Reference numeral 60 denotes a mode dial switch for selecting various function modes such as an automatic image sensing mode, a program image sensing mode, a panoramic image sensing mode, a playback mode, a multi-image playback/deletion mode, and a PC connection mode.

Reference numeral 62 denotes a shutter switch SW1 turned ON by a first stroke (for example, a half stroke) of a shutter button, not shown, to instruct start of the operations of the AF processing, the AE processing, the AWB processing, the EF processing and the like.

Reference numeral 64 denotes a shutter switch SW2 turned ON by a second stroke (for example, a full stroke) of the shutter button, not shown, to instruct the start of a series of operations comprising exposure processing to write a signal read from the image sensing element 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the memory 30.

Reference numeral 66 denotes a single shot/sequential image sensing switch, capable of setting a single-shot mode, in which a single frame is sensed and the apparatus put into a standby state when the shutter switch SW2 is pressed, and a sequential image sensing mode, in which sequential image sensing continues to be carried out as long as the shutter switch SW2 is pressed.

Reference numeral 70 denotes an operation unit comprising various buttons and touch panels including a menu button, a set button, a macro button, a multi-image playback/repaging button, a flash setting button, a self-timer button, a forward (+) menu item selection button, a backward (−) menu item selection button, a forward (+) playback image search button, a backward (−) playback image search button, an image sensing quality selection button, an exposure correction button, a date/time set button, and a multi-image playback/deletion mode. Further, the operation unit 70 has a playback switch for setting a playback mode including function modes such as a PC connection mode and the like, as well as an AF mode setting switch for setting the apparatus to either a one-shot AF mode or a servo AF mode. In the one-shot AF mode, when the shutter switch SW1 is pressed the auto focus operation is started, and once focused, that focused state is maintained. In the servo AF mode, as long as the shutter switch SW1 is pressed, the sequential auto focus operation is continued. Further, the operation unit 70 has an image display ON/OFF switch that switches the image display unit 28 ON/OFF, a quick review ON/OFF switch that sets a quick review function that automatically reproduces sensed image data immediately after image sensing. Further, the operation unit has a compression mode switch for selecting a JPEG compression rate or a CCDRAW mode for digitizing the image sensing element signal as is to the recording medium. In addition, the operation unit 70 has a communication start button for instructing the start of communication with the image processing apparatus 300, a communication end button for instructing the end of communication, an REC/PB switch for switching between operation modes including the recording mode and the playback mode, a connection destination registration (pairing) button, and so forth. Further, the operation unit has an auto power OFF switch for setting/releasing an auto power mode (power saving mode). Moreover, the functions of the plus buttons and the minus buttons described above can more easily select values and functions by providing rotary dials switches.

Reference numeral 72 denotes a main power switch, with which power can be switched ON and OFF.

Reference numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for a required length of time.

Reference numerals 82 and 84 denote connectors, and 86 denotes the power source comprising a primary battery such as an alkaline battery or a lithium battery, a secondary battery such as a NiDd battery, a NiMH battery an Li-ion battery, or an Li polymer battery, an AC adapter or the like.

Reference numeral 102 denotes a barrier, which is a protective device that covers the image sensing portion of the image sensing apparatus 100, including the lens 10, to prevent dirtying of and damage to the image sensing portion.

Reference numeral 104 denotes the optical finder 104, which can alone be used for image sensing without the electronic view finder function by the image display unit 28. In addition, some of the functions of the notification unit 54, including the indication of focus state, the camera shake warning, the flash charge state, the shutter speed, the f number (aperture), the exposure compensation and the like are displayed within the optical finder 104.

Reference numeral 110 denotes the communication unit 110, which has a variety of short-range, high-speed communication functions, such as wireless LAN communication typified by IEEE802.11b or IEEE802.11g, spread spectrum communication typified by Bluetooth, and infrared communication typified by IrDA.

Reference numeral 112 denotes an antenna that connects the image sensing apparatus 100 to other devices via the communication circuit 110.

(Configuration of the Image Processing Apparatus 300)

Figure 3:
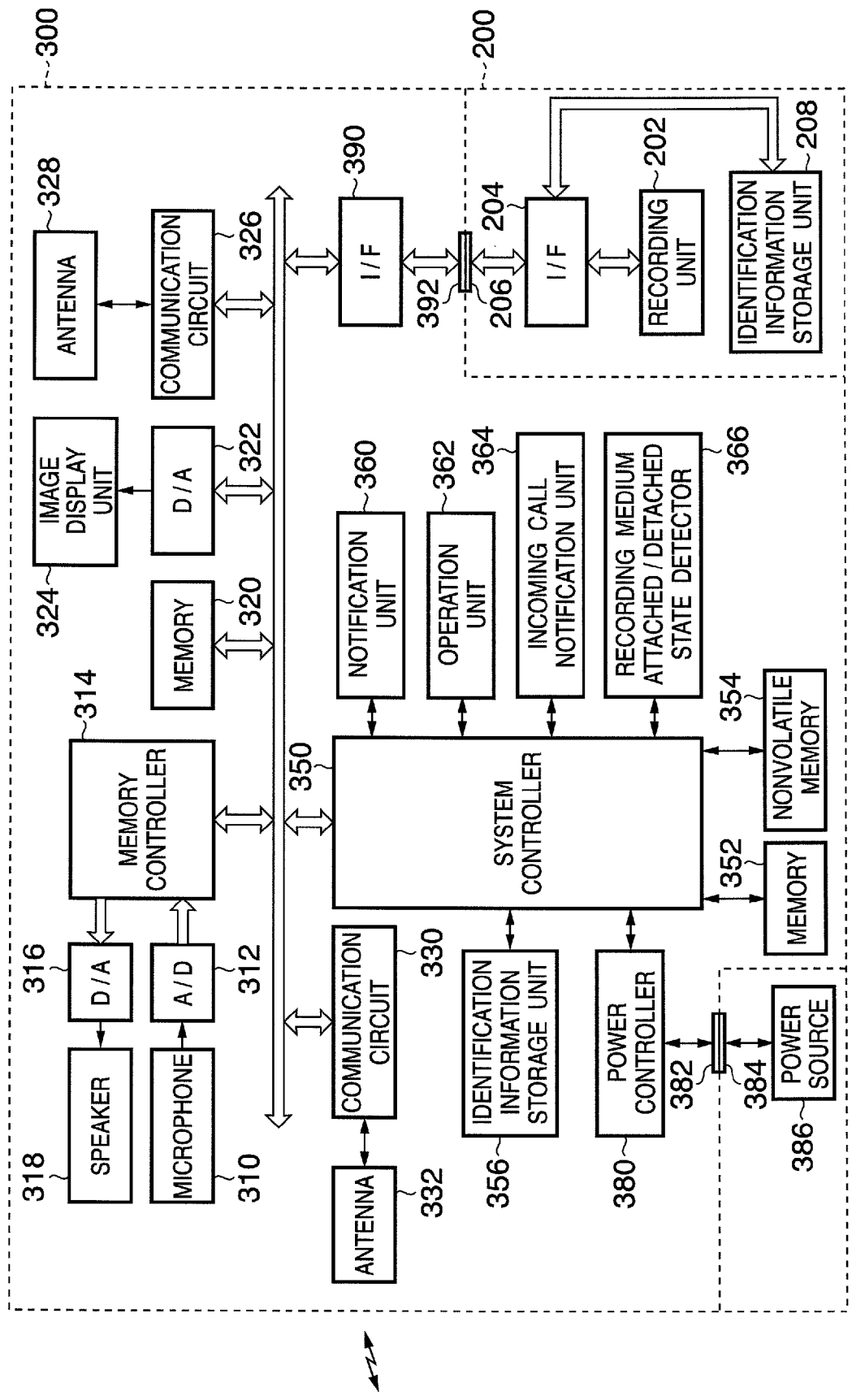
FIG. 3 is a block diagram showing the configuration of an image processing apparatus according to the first embodiment of the present invention.

FIG. 3 is a block diagram showing the configuration of the image processing apparatus 300 in the first embodiment of the present invention.

In FIG. 3, reference numeral 310 denotes a microphone that converts audio into electrical signals and 312 denotes an A/D converter that converts the analog output signals from the microphone into digital signals.

Reference numeral 314 denotes a memory controller. Output data from the A/D converter 312 is written to a memory 320 via the memory controller 314, and data read out from the memory 320 is input to a D/A converter 316.

Reference numeral 316 denotes the D/A converter, which converts digital signals into analog signals, and 318 denotes a speaker that converts electrical signals into audio signals.

Reference numeral 320 denotes the memory for storing audio input at the microphone 310 as well as still images and moving images transmitted from the image sensing apparatus 100. The memory 320 is provided with sufficient memory capacity to store a predetermined number of still images as well as moving images of a predetermined length of time duration.

Reference numeral 322 denotes a D/A converter that converts the still image data and the moving image data stored in the memory 320 into analog signals, and 324 denotes an image display unit that displays image signals outputted by the D/A converter 322.

Reference numeral 326 denotes a communication circuit, which has a variety of long-distance wireless communication functions such as TDMA, CDMA and W-CDMA. Reference numeral denotes 328 denotes an antenna that connects the image processing apparatus 300 with another image processing apparatus or with a communication base station using the communication circuit 326.

Reference numeral 330 designates a communication circuit, which has a variety of short-range, high-speed data communication functions, such as IEEE802.11b or IEEE802.11g wireless LAN communication, Bluetooth spread spectrum communication, IrDA infrared communication, and so forth. Reference numeral 332 denotes an antenna that connects the image processing apparatus 300 to other devices using the communication circuit 330.

Reference numeral 350 denotes a system controller that controls the entire image processing apparatus 300 and 352 denotes a memory that stores the constants, variables, and programs for the operation of the system controller 350.

Reference numeral 354 denotes an electrically erasable and recordable nonvolatile memory such as an EEPROM.

Reference numeral 356 denotes an identification information storage unit that stores identification information, in which a variety of identification information for carrying out authentication prior to communication when communicating with the image sensing apparatus 100 through the communication circuit 330 and the antenna 332. It should be noted that the identification information storage unit 356 may be configured as a part of the nonvolatile memory 354 or another memory.

Reference numeral 360 indicates a notification unit, which reports operating statuses, messages and the like to the outside by using characters, images, sound and the like, in response to the execution of the program by the system controller 350. The notification unit 360 comprises one or more combinations of display devices including an LCD and an LED for visual notification and sound generating devices for audio notification. In particular, the display device or devices is/are provided in one or more visually-recognizable positions around an operation unit 362 of the image processing apparatus 300.

Reference numeral 362 denotes an operation unit for inputting various operation instructions to the system controller 350, comprising a single or a plurality of combinations of switches, dials, touch panels, a device for pointing by line-of-sight detection, a voice recognition device, and the like.

With the operation unit 362, such operations as turning the power to the image processing apparatus 300 ON/OFF, initiating/terminating a call (off-hook/on-hook), telephone number input, telephone number search, communication mode switching and the like can be carried out.

Reference numeral 364 denotes an incoming call notification unit, which can notify a user of the image processing apparatus 300 of an incoming call using sound, such as a ring tone, a voice or music, images, such as an icon, a moving image, a still image or a light, vibration, and so forth in the event that there is an incoming call from another image processing apparatus or from a communications base station.

Reference numeral 366 denotes a recording medium attached/detached state detector that detects whether or not the recording medium is attached to a connector 392.

Reference numeral 380 denotes a power controller, comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 350, and supplies a necessary voltage to the respective parts including the recording medium for a required length of time.

Reference numerals 382 and 384 denote connectors, and 386 denotes a power source comprising a primary battery such as an alkaline battery or a lithium battery, a secondary battery such as an NiDd battery, an NiMH battery, an Li-ion battery, or an Li polymer battery, an AC adapter or the like.

Reference numeral 390 denotes an interface with a recording medium such as a memory card or a hard disk and the like, and 392 denotes a connector for connecting to the recording medium such as the memory card or the hard disk and the like.

It should be noted that, in the present embodiment, the interface and the connector for installing the recording medium form one system. Of course, as can be appreciated by those skilled in the art, the present embodiment may be configured as either a single system of interfaces and connectors or a plurality of systems of interfaces and connectors. Moreover, the present embodiment may be configured so as to combine interfaces and connectors of different standards.

As the interfaces and the connectors, those in conformity with the standards of PCMIA cards or CF (Compact Flash (registered trademark)) cards, SD (Secure Digital) cards, MCCs (Multi Media Card) or the like may be used. It should be noted that the present invention is not limited to these standards, and alternatively those that conform to other standards may be used. If those that conform to the standards of PCMIA cards, CF (registered trademark) cards, SD cards, or the like are used for the interface 390 and the connector 392, it is possible to connect a variety of communication cards. The communication cards may, for example, be LAN cards or modem cards, USB2 cards, IEEE1394 cards, P1284 cards, SCSI cards, PHS communication cards and the like. By connecting these communication cards, image data and management information attached to the image data can be exchanged with peripheral devices such as other computers, printers and so forth.

(Configuration of the Recording Medium 200)

As shown in FIG. 3, the recording medium 200 comprises a recording unit 202, comprising a semiconductor memory, magnetic disk or the like; an interface 204 for the image processing apparatus 300; a connector 206 that connects to the image processing apparatus 300; and an identification information storage unit 208 that stores identification information.

It should be noted that, for the recording medium 200, it is possible to use a memory card, such as a PCMCIA card or CF (registered trademark) card, a SD memory card, MMC, a hard disk, or the like. Besides these, the recording medium 200 may of course be configured as a micro DAT, a magneto-optic disk, a CD-R or CD-WR optical disk, a DVD or other phase change optical disk and the like.

In addition, the recording medium 200 may of course be configured as a composite medium comprising a memory card and a hard disk or the like integrated into a single unit, and further, a part of that composite medium may be detachable.

(Operation of the Image Sensing Apparatus 100)

Next, a description is given of the operation of the image sensing apparatus 100 having the above-described configuration of the first embodiment, with reference to FIG. 4 through FIG. 9.

Figure 4:
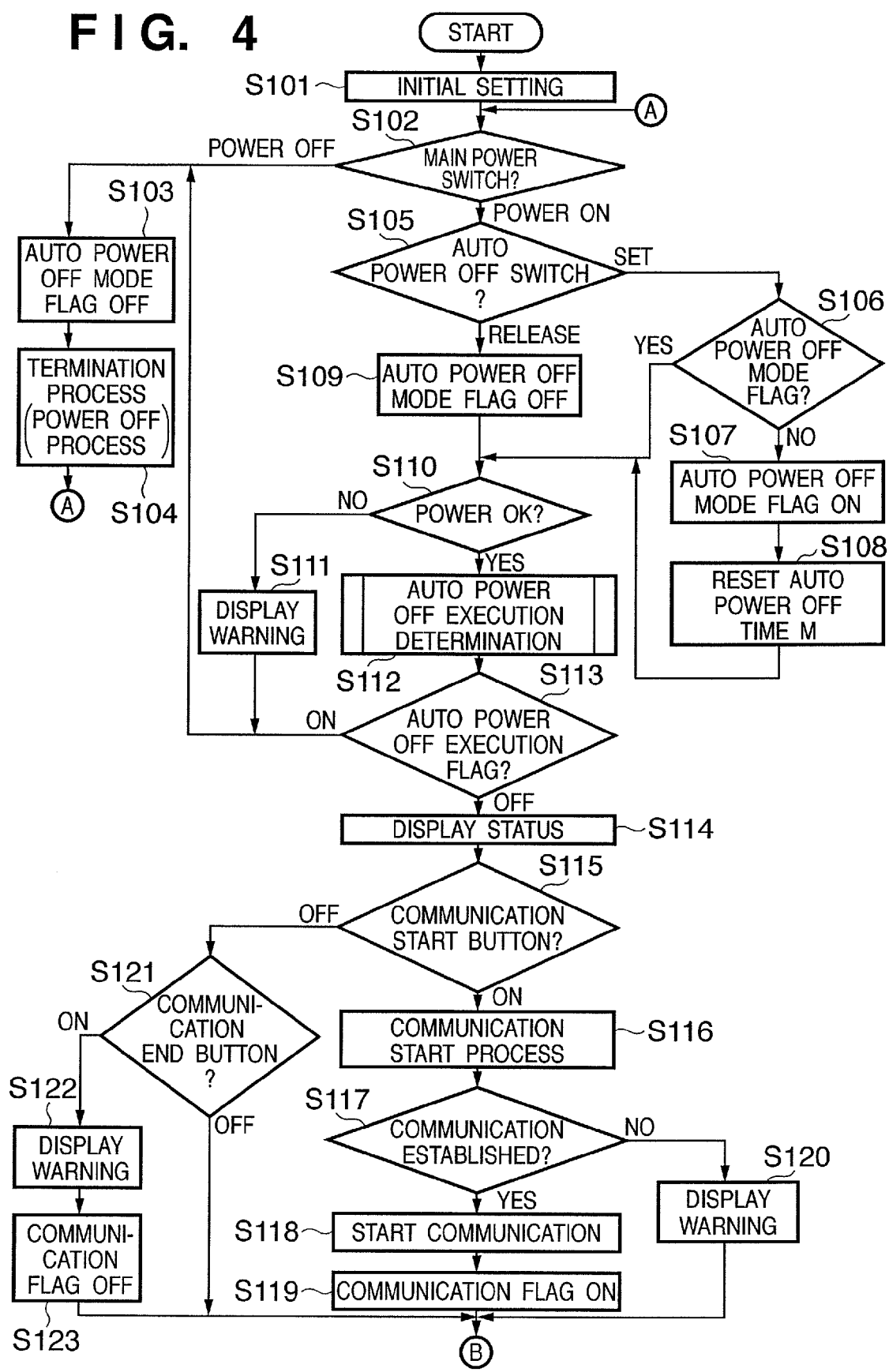
FIG. 4 is a flow chart illustrating a portion of a main routine of the image sensing apparatus according to the first embodiment of the present invention.
Figure 5:
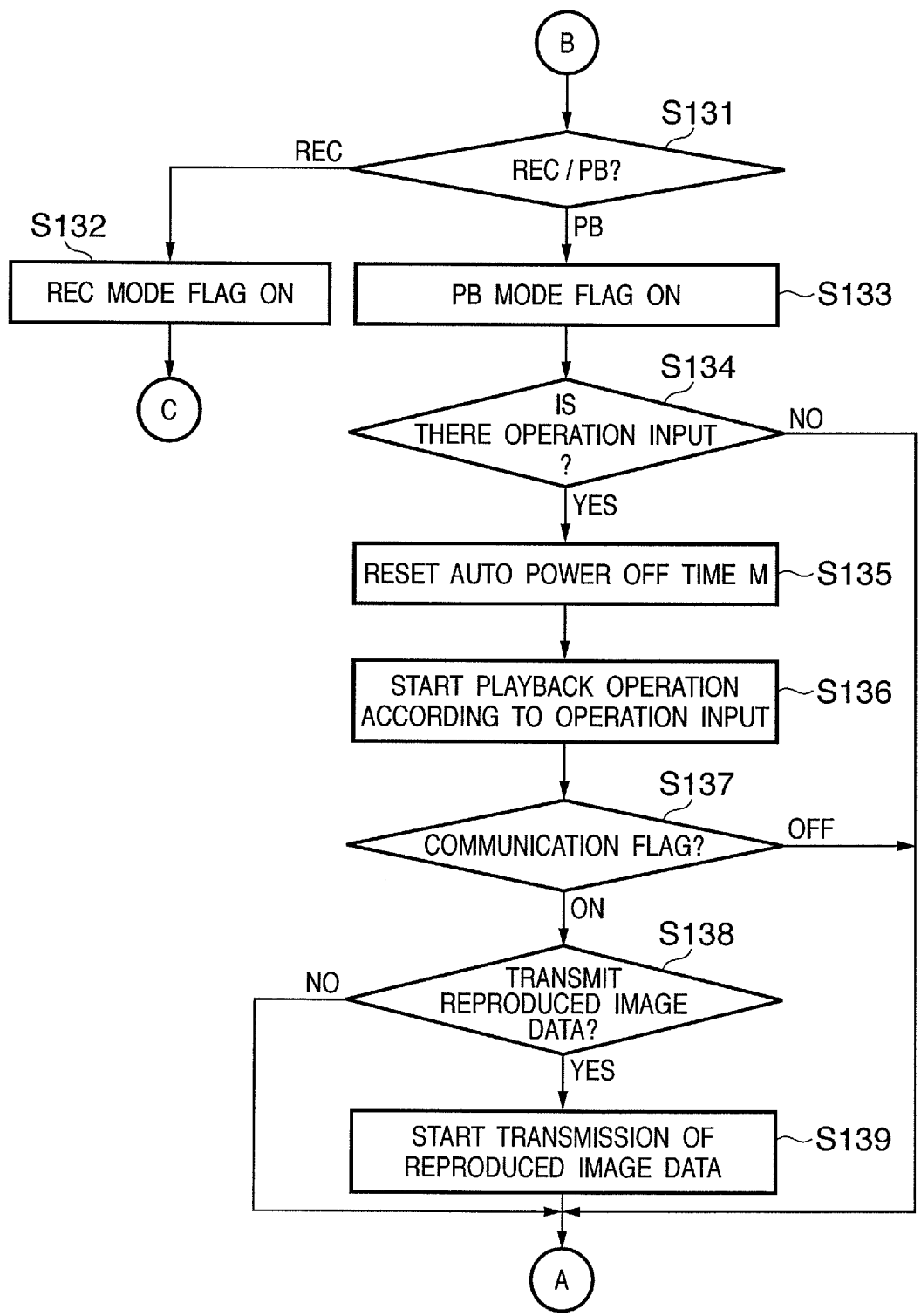
FIG. 5 is a flow chart illustrating a portion of the main routine of the image sensing apparatus according to the first embodiment of the present invention.
Figure 6:
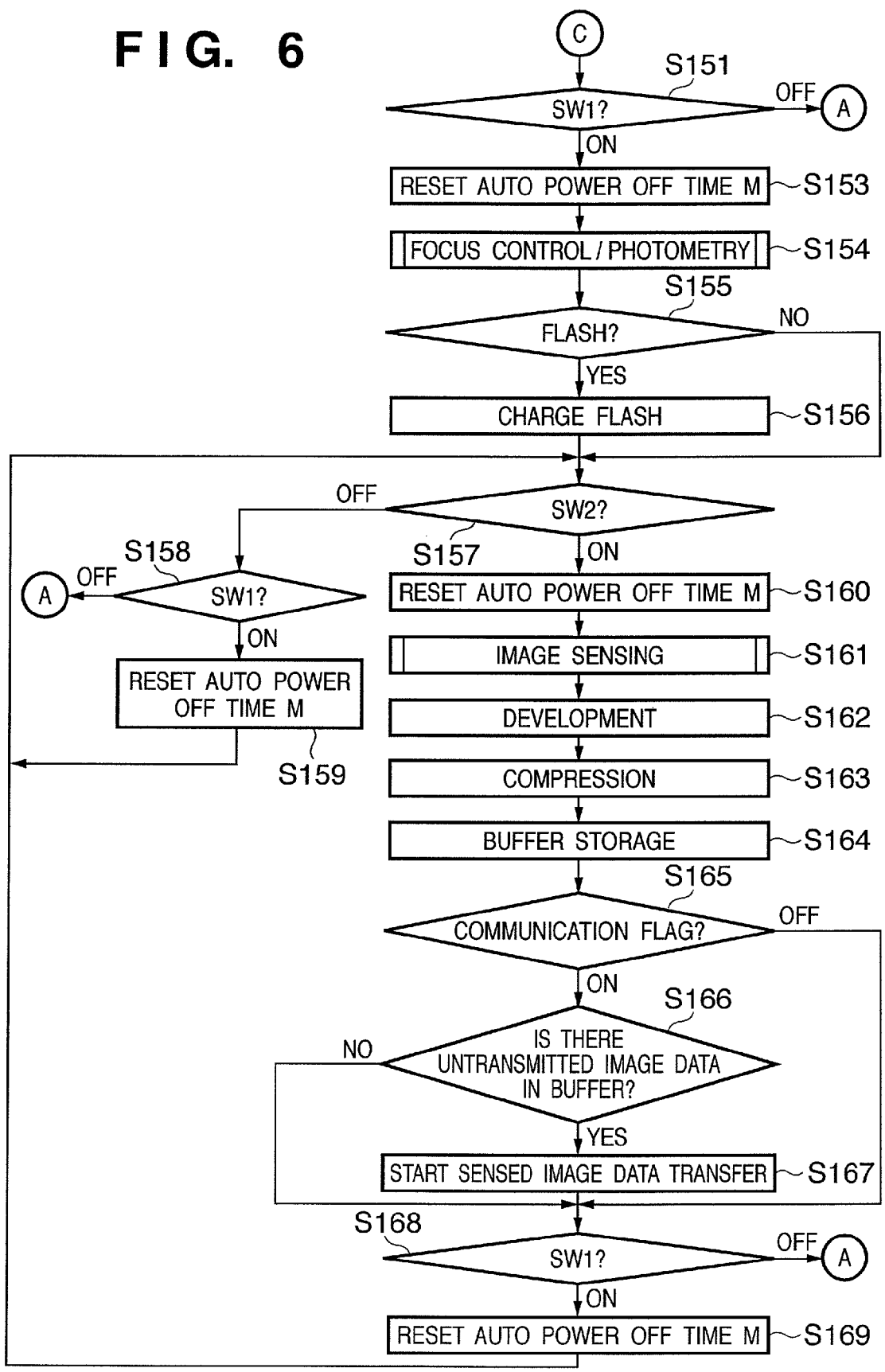
FIG. 6 is a flow chart illustrating a portion of the main routine of the image sensing apparatus according to the first embodiment of the present invention.

FIGS. 4 through 6 are flow charts illustrating a main routine of the image sensing apparatus 100 of the first embodiment of the present invention.

In FIG. 4, when the apparatus is supplied with power, by an ON operation using the main power switch 72, the replacement of the battery or the like, the system controller 50 initializes flags, control variables and the like as well as carries out initialization processes for all parts of the image sensing apparatus 100 (step S101).

Next, the system controller 50 confirms the status of the main power switch 72 (step S102), and sets an auto power off mode flag to OFF (step S103) if the main power switch 72 is set to power OFF.

Then, in step S104, the system controller 50 changes the display of the display units to an end state, closes the barrier 102 to protect the image sensing part, and records the necessary parameters, set values and set modes, including flags, control variables and so forth, in the nonvolatile memory 56. Further, the system controller 50 performs a predetermined termination process (a power off process such as cutting off unnecessary power to parts of the image sensing apparatus 100 including the image display unit 28 using the power controller 80), after which the routine returns to step S102.

If in step S102 it is found that the main power switch 72 is set to power ON, then the routine proceeds to step S105. The system controller 50 then determines whether or not an auto power off mode (power saving mode) is set using an auto power off mode switch included in the operation unit 70. If the auto power off mode is set, then the routine proceeds to step S106 to determine the status of an auto power off mode flag stored in an internal memory of the system controller 50 or in the memory 52. If the auto power off mode flag is ON, then the routine directly proceeds to step S110. On the other hand, if the auto power off mode flag is OFF, then the system controller 50 changes the auto power off mode flag to ON and stores the new flag status in the system controller 50 internal memory or in the memory 52 (step S107). Further, the system controller 50 resets an auto power off time M and stores the new time M in the system controller 50 internal memory or in the memory 52 (step S108), and the routine proceeds to step S110.

On the other hand, if in step S105 it is found that the auto power off mode is released by the auto power off mode switch, then the system controller 50 turns the auto power off mode flag OFF (step S109) and the routine proceeds to step S110.

In step S110, using the power controller 80 the system controller 50 determines whether or not the remaining power level or the operating status of the power source 86 comprising a battery or the like poses a problem for the operation of the image sensing apparatus 100. If there is a problem (NO is step S110), then the system controller 50 provides a predetermined warning by image and/or by sound using the notification unit 54 and/or the image display unit 28 (step S111), after which the system controller 50 performs the processes of steps S103 and S104 described above and the routine returns to step S102.

On the other hand, if there is no problem with the power source 86 (YES in step S110), then the system controller 50 acquires the elapsed time since resetting of the auto power off time M stored in the system controller 50 internal memory or in the memory 52 and determines whether or not it should execute an auto power off operation (step S112). The auto power off execution determination process performed in step S112 is described in detail later using FIG. 9.

Next, in step S113, the system controller 50 determines the status of an auto power off execution flag. If the auto power off execution flag is ON, the system controller 50 performs the processes of steps S103 and S104 described above and the routine returns to step S102.

On the other hand, if the auto power off execution flag is OFF, then the system controller 50 provides a display of the various setting statuses of the image sensing apparatus 100 including the battery remaining power and the status of the memory using the notification unit 54 or the image display unit 28 (step S114).

After the process of step S114, in step S115 the system controller 50 determines whether or not a communication start button contained in the operation unit 70 of the image sensing apparatus 100 has been pressed. If the communications start button has not been pressed, then the routine proceeds to step S121.

In step S121, the system controller 50 determines whether or not a communication end button contained in the operation unit 70 has been pressed, and if not, the routine proceeds to step S131 shown in FIG. 5. If the communication end button has been pressed, then in step S122 the system controller 50 provides a warning display with image and/or sound using the notification unit 54 and/or the image display unit 28 and sets a communication flag to OFF if communications are in progress, after which the routine proceeds to step S131.

If the communication start button has been pressed, (YES in step S115), the system controller 50 performs a communication start process in order to establish a state of communication with the image processing apparatus 300 (step S116).

As a result of executing the communication start process, the system controller 50 determines whether or not communication has been established between the image sensing apparatus 100 and the image processing apparatus 300 (step S117). If communication has not been established, the system controller 50 provides a predetermined warning, with image and/or sound, using the notification unit 54 and/or the image display unit 28 (step S120), and the routine proceeds to step s131 shown in FIG. 5.

On the other hand, if communication has been established between the image sensing apparatus 100 and the image processing apparatus 300 (YES in step S117), the system controller 50 starts communication with the image processing apparatus 300 (step S118). Further, the communication flag stored in the system controller 50 internal memory or in the memory 52 is set to ON (step S119) and the routine proceeds to step S131 shown in FIG. 5.

In step S131, the system controller 50 determines the setting status of the REC/PB switch contained in the operations unit 70. If the REC/PB switch has been set to REC (step S131), the system controller 50 sets a REC mode flag stored in the system controller 50 internal memory or in the memory 52 to ON (step S132). The routine then proceeds to step S151 shown in FIG. 6.

If in step S131 it is found that the REC/PB switch has been set to PB, the system controller 50 sets the PB mode flag stored in the system controller 50 internal memory or in the memory 52 to ON (step S133) and the routine proceeds to step S134. It should be noted that the REC mode flag and the PB mode flag are such that, when one is ON, the other is always OFF.

In step S134, the system controller 50 confirms operation input to a mode dial 60, shutter switches 62, 64, single shot/sequential image sensing switch 66, and/or to buttons and switches contained in the operation unit 70. If there has been no operation input (NO in step S134), the routine returns to step S102 shown in FIG. 4.

On the other hand, if there has been an operation input (YES in step S134), then the system controller 50 resets the auto power off time M and stores the reset auto power off time M in the system controller 50 internal memory or in the memory 52 (step S135). Then, the system controller 50 executes a playback operation in response to the operation input (step S136) and the routine proceeds to step S137.

In step S137, the system controller 50 confirms the status of the communication flag. If the communication flag is OFF, the routine returns to step S102 shown in FIG. 4. If the communication flag is ON, the routine proceeds to step S138. In step S138, the system controller 50 determines whether or not to transmit reproduced image data. If reproduced image data is to be transmitted, the system controller 50 starts transmission of produced image data in step S139, after which the routine returns to step S102 shown in FIG. 4. If no playback image is to be transmitted, the routine returns directly to step S102 shown in FIG. 4.

On the other hand, if the REC/PB switch is set to REC and in step S132 the REC mode flag is found to be ON, then the routine proceeds to step S151 shown in FIG. 6 and the system controller 50 confirms the status of the shutter switch SW1. If the shutter switch SW1 has not been pressed, the routine returns to step S102. If the shutter switch SW1 has been pressed (YES in step S151), the system controller 50 resets the auto power off time M and stores the reset auto power off time M in the system controller 50 internal memory or in the memory 52 (step S153) and the routine proceeds to step S154.

The system controller 50 performs focus control processing and focuses the image sensing lens on the subject, performs photometry processing and determines the f number and the shutter speed, and performs white balance processing and matches the color temperature (step S154). Depending on the results of the photometry, if necessary the system controller 50 sets a flash flag and sets the flash as well. It should be noted that, in the focus control/photometry processing, the system controller 50 confirms the statuses of an image sensing start flag and/or an AE lock flag and/or a white balance mode setting flag stored in the system controller 50 internal memory or in the memory 52. Then, depending on these statuses, the system controller 50 determines whether or not to execute AE control and/or AWB control, and performs each individual process according to the results of that determination. The focus control/photometry processing performed in step S154 is described in detail later using FIG. 7.

Once the focus control/photometry processing (step S154) is finished, the system controller 50 determines the status of the flash flag stored in the system controller 50 internal memory or in the memory 52 (step S155). If the flash flag has been set, the flash 48 is charged (step S156) and the routine proceeds to step S157. If the flash flag has been released, the routine proceeds directly to step S157.

If the shutter switch SW2 has not been pressed (OFF in step S157), and further, the shutter switch SW1 has been released as well (OFF in step S158), the system controller 50 returns to step S102. If the shutter switch SW1 has remained pressed (ON in step S158), the system controller 50 resets the auto power off time M and stores the reset auto power off time M in the system controller 50 internal memory or in the memory 52 (step S159), and returns to step S157.

If the shutter switch SW2 has been pressed (ON in step S157), the system controller 50 resets the auto power off time M and stores the reset auto power off time M in the system controller 50 internal memory or in the memory 52 (step S160) and the routine proceeds to step S161.

Next, in step S160, the system controller 50 executes an image sensing process. In the image sensing process, image data sensed by the image sensing element 14 is written to the memory 30 either through, the A/D converter 16, the image processor 20 and the memory controller 22, or via the memory controller 22 directly from the A/D converter 16. The image sensing process performed in step S161 is described in detail later with reference to FIG. 8.

Next, the system controller 50, using the memory controller 22 and as necessary the image processor 20, reads out the image data written to the memory 30 and executes development processing that performs a variety of processes on the image data (step S162). Further, after performing an image compression process in accordance with the set mode using the compression/expansion circuit 32 as necessary (step S163), image data that has undergone predetermined processing is stored in a buffer area secured in the memory 30 (step S164).

Next, the system controller 50 determines the status of the communication flag stored in the system controller 50 internal memory or in the memory 52 (step S165) and proceeds to step S168 if the communication is OFF. If the communication flag is ON, the system controller 50 determines whether or not there is image data in the buffer area secured in the memory 30 that has not yet been transferred from the image sensing apparatus 100 to the image processing apparatus 300 (step S166). If there is no untransferred data (NO in step S166), the routine proceeds to step S168.

If there is untransferred data (YES in step S166), the system controller 50 starts to transfer the untransferred image data from the buffer area secured in the memory 30 via the communication circuit 110 and the antenna 111 (step S167) and the routine proceeds to step S168.

In step S168, the system controller 50 confirms the status of the shutter switch SW1. If the shutter switch SW1 has been pressed, the system controller 50 resets the auto power off time M and stores the reset auto power off time M in the system controller 50 internal memory or in the memory 52 (step S169) and the routine returns to step S157. If the shutter switch SW1 has not been pressed, the routine returns to step S102 shown in FIG. 4.

Figure 7:
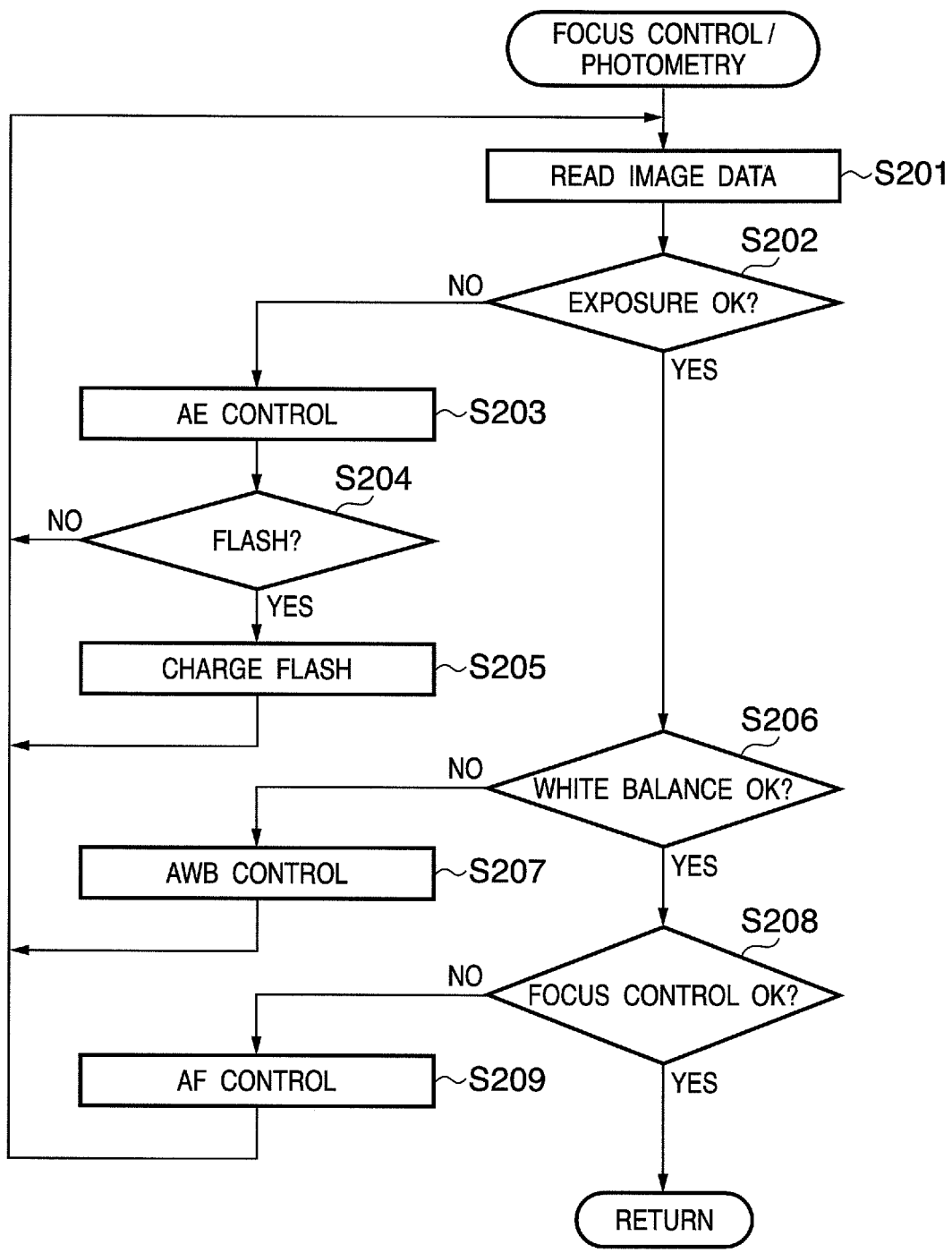
FIG. 7 is a flow chart of a focus control/photometry routine of the image sensing apparatus according to the first embodiment of the present invention.

FIG. 7 is a flow chart illustrating in detail the focus control/photometry processing of step S154 shown in FIG. 6. The system controller 50 reads electrical signals from the image sensing element 14 and sequentially reads image data into the image processor 20 via the A/D converter 16 (step S201). Using the sequentially read image data, the image processor 20 performs predetermined calculations used in TTL-type AE processing, EF processing and AF processing.

It should be noted that, in the foregoing processes, the necessary number of particular portion/portions is/are cut out and extracted out of the entire number of sensed pixels as necessary for use in calculating, enabling the best calculations to be performed for different modes, such as a center weighted mode, an average mode, and a rated mode, in each of the TTL-type AE, EF, AWB and AF processes.

Using the results of the calculations performed at the image processor 20, the system controller 50 performs AE using the exposure controller 40 (step S203) until the system controller 50 determines that the exposure (AE) is proper (until YES in step S202). The routine then proceeds to step S204 and the system controller 50 determines whether or not a flash is necessary using the measurement (photometric) data obtained by AE control. If the flash is necessary (YES in step S204), the system controller 50 sets the flash flag and charges the flash 48 (step S205).

If the exposure (AE) is deemed proper (YES in step S202), the measurement data and/or the setting parameters are stored in the system controller 50 internal memory or in the memory 52.

Next, using the results of the calculations performed by the image processor 20 and the measurement data obtained by AE control the system controller 50 determines whether or not the white balance (AWB) is proper. The system controller 50 adjusts the parameters of the color processing using the image processor 20 and performs AWB control (step S207) until the AWB is determined to be proper (until YES in step S206).

Once the AWB is deemed to be proper (YES in step S206), the measurement data and/or the setting parameters are stored in the system controller 50 internal memory or in the memory 52.

Next, using the results of the calculations performed by the image processor 20 and the measurement data obtained by AE control and AWB control, the system controller 50 performs focus control (AF). The system controller 50 performs AF control using the focus controller 42 (step S209) until the results are determined to be in focus (as long as NO in step S208).

Once the focus control (AF) results are determined to be in focus (YES in step S208), the measurement data and/or the setting parameters are stored in the system controller 50 internal memory or in the memory 52 and the focus control/photometry processing routine (step S154) is ended.

Figure 8:
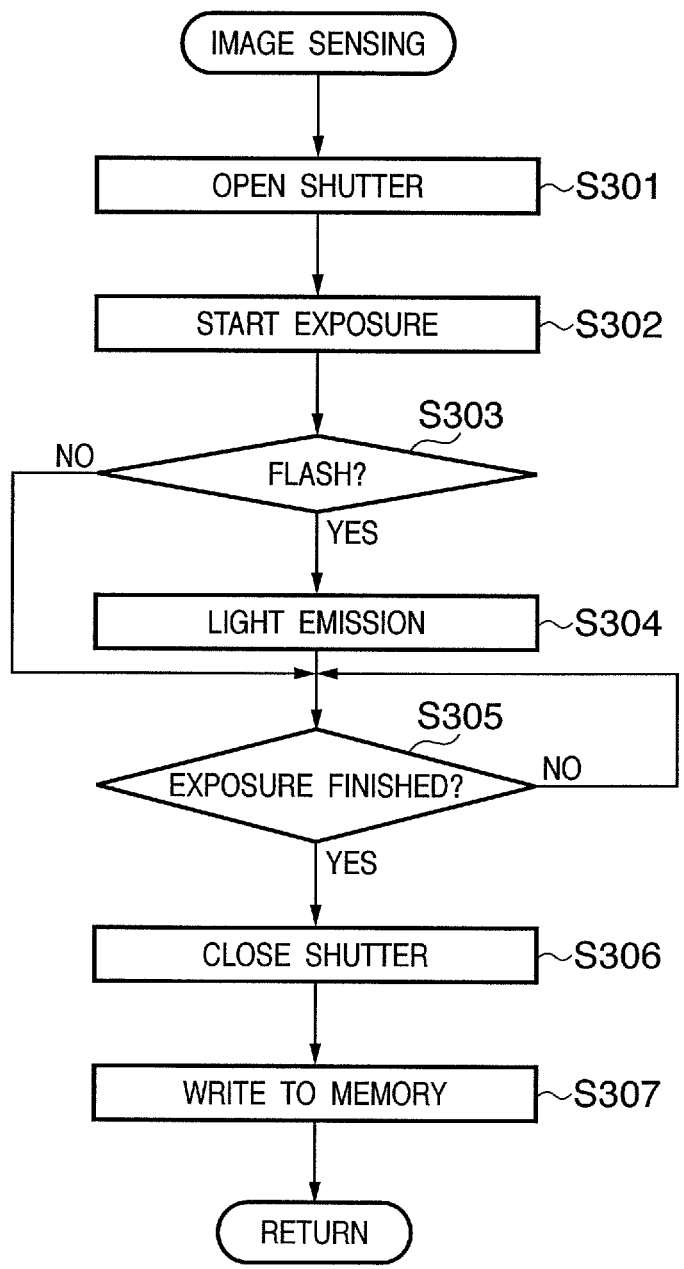
FIG. 8 is a flow chart illustrating an image sensing routine of the image sensing apparatus according to the first embodiment of the present invention.

FIG. 8 is a flow chart illustrating in detail the image sensing process of step S161 shown in FIG. 6.

The system controller 50, in step S301, reads out the photometric data and/or the setting parameters stored in the system controller 50 internal memory or in the memory 52. Then, using the exposure controller 40, the system controller 50 opens the shutter 12 having the aperture function to an f number that corresponds to the read-out photometric data and starts exposure of the image sensing element 14 (step S302).

In step S303, whether the flash flag is set is checked and it is determined whether or not the flash 48 is necessary, and if necessary the flash is caused to emit light (step S304). The system controller 50 then awaits the end of exposure of the image sensing element 14 in accordance with the photometric data (step S305), closes the shutter 12 (step S306), and reads the electrical signals from the image sensing element 14. Then, through the A/D converter 16, the image processor 20 and the memory controller 22, or through the memory controller 22 directly from the A/D converter 16, the system controller 50 writes the sensed image data to the memory 30 (step S307).

Once this series of processes ends, the image sensing process routine (step S161) is ended.

Figure 9:
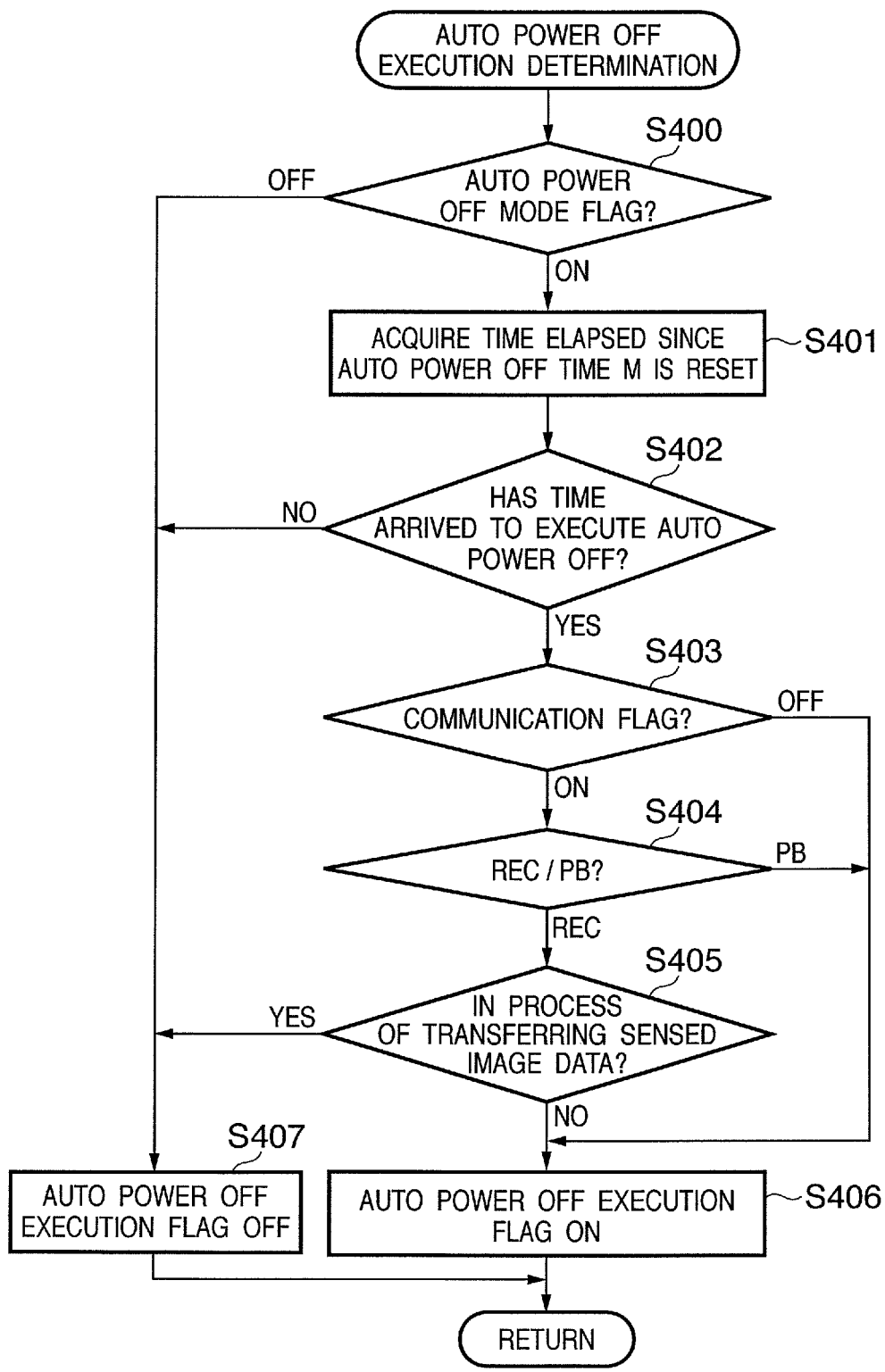
FIG. 9 is a flow chart illustrating an auto power off execution determination processing routine of the image sensing apparatus according to the first embodiment of the present invention.

FIG. 9 is a flow chart illustrating in detail the auto power off execution determination process of step S112 shown in FIG. 4.

The system controller 50 first confirms the status of the auto power off mode flag (step S400). If the auto power off mode flag is OFF, then the auto power off mode is not set, and therefore the routine proceeds to step S407 and the system controller 50 sets the auto power off execution flag to OFF. In this way, when the auto power off mode flag is OFF, the auto power off execution flag is set to OFF and therefore the image sensing apparatus 100 power off process is not performed.

On the other hand, if the auto power off mode flag is ON, then the system controller 50 acquires an elapsed time after the resetting of the auto power off time M stored in the system controller 50 internal memory or in the memory 52 from a timer that is either internal to or external to the system controller 50 (step S401). Then, from the elapsed time since the acquired auto power off time M is reset the system controller 50 determines whether or not a time has arrived at which the auto power off operation should be executed (step S402).

If the time has not arrived at which the auto power off operation should be executed (NO in step S402), the system controller 50 sets the auto power off execution flag stored in the system controller 50 internal memory or in the memory 52 to OFF (step S407). The auto power off execution determination routine (step S112) is then ended.

On the other hand, if the time has arrived at which the auto power off operation should be executed (YES in step S402), the system controller 50 determines the status of the communication flag stored in the system controller 50 internal memory or in the memory 52 (step S403). Then, if the communication flag has not been set, the routine proceeds to step S406.

If the communication flag has been set (ON in step S403), the system controller 50 determines the setting status of the REC/PB switch included in the operation unit 70 (step S404). If the REC/PB switch has been set to REC, the routine proceeds to step S405. If the REC/PB switch has been set to PB, the routine proceeds to step S406.

In step S405, if there is image data in the process of being transferred from the image sensing apparatus 100 to the image processing apparatus 300, the routine proceeds to step S407, the auto power off execution flag is set to OFF and the auto power off execution determination routine (step S112) is ended.

If no data is in the process of being transmitted, then the routine proceeds to step S406. In step S406, the system controller 50 sets the auto power off execution flag stored in the system controller 50 internal memory or in the memory 52 to ON and terminates the auto power off execution determination routine (step S112).

Thus, as described above, by turning the auto power off execution flag OFF while sensed image data is being transferred to the image processing apparatus 300, it is possible to control the apparatus not to execute the power off process while image data is being transferred even if the auto power off mode has been set. In addition, because the auto power off time M is not reset even when image data is in the process of being transferred, if a predetermined period of time elapses at the time of finishing the transference of image data, the auto power off execution flag is immediately set to ON and thus the electronic camera battery is not needlessly consumed.

(Operation of the Image Processing Apparatus 300)

A description will now be given of the operation of the image processing apparatus 300 of the first embodiment, with reference to FIG. 10.

Figure 10:
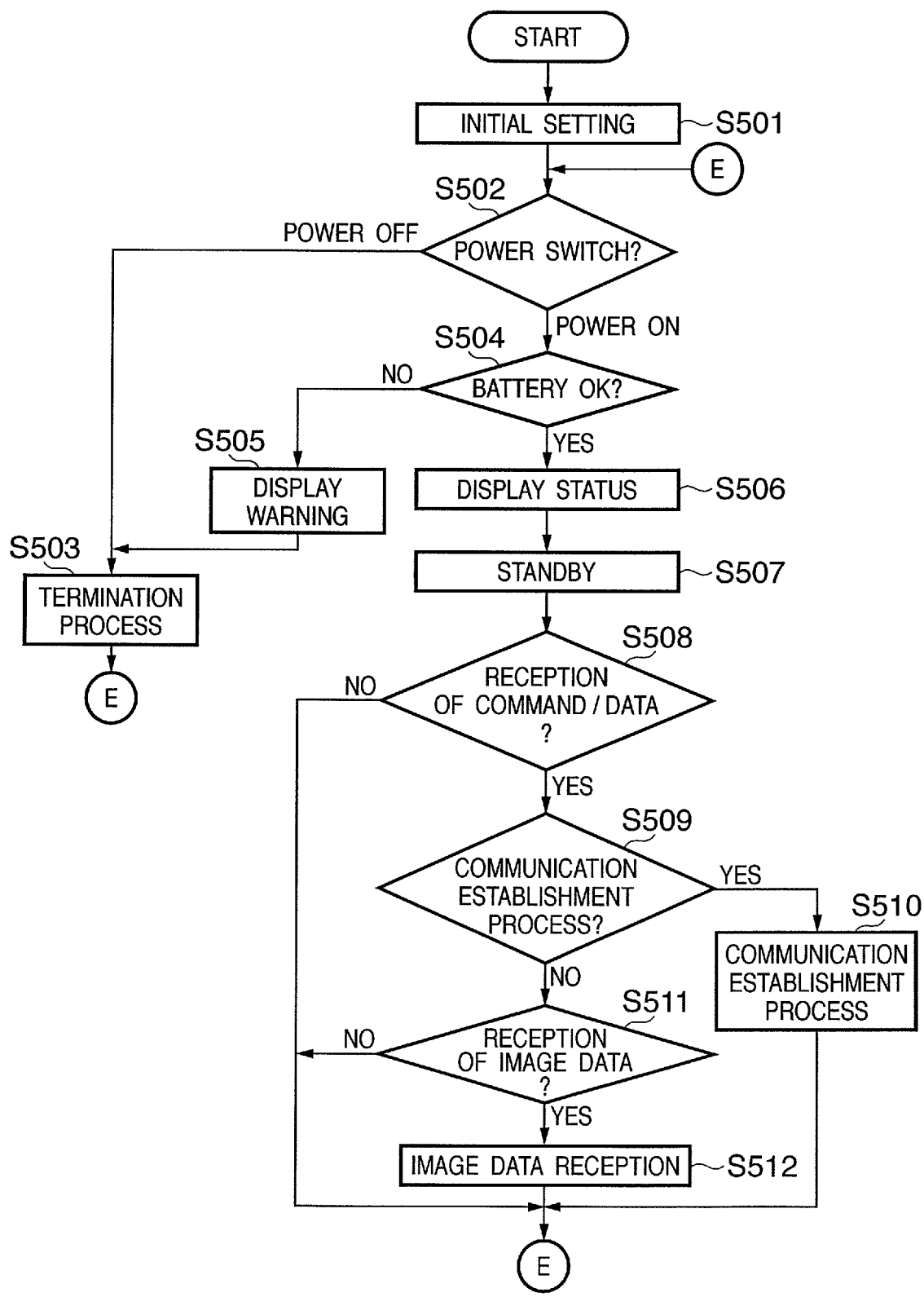
FIG. 10 is a flow chart illustrating a main routine of an image processing apparatus according to the first embodiment of the present invention.

FIG. 10 is a flow chart illustrating a main routine of the image processing apparatus 300 of the present embodiment.

In FIG. 10, as the apparatus is provided with power by the replacement of the battery or the like, the system controller 350 initializes flags, control variables and the like and also initializes the component parts of the image processing apparatus 300 (step S501).

Next, the system controller 350 confirms the status of the power switch included in the operation unit 362 (step S502). If the power switch has been set to OFF, the system controller 350 changes the display of the display units to an end state and stores the necessary parameters, including flags, control variables and the like, as well as set values and set modes, to the nonvolatile memory 354. The system controller 350, after performing a predetermined termination process (power off process) that cuts off unneeded power to parts of the image processing apparatus 300 including the image display unit 324 through the power controller 380 (step S503), returns to step S502. If in step S502 the power switch contained in the operation unit 362 has been set to power ON, the routine proceeds to step S504.

In step S504, the system controller 350, through the power controller 380, determines whether or not the remaining power level and the operating status of the power source 386 comprising a battery or the like poses a problem for the operation of the image processing apparatus 300. If there is a problem (NO in step S504), the system controller 350 issues a predetermined warning by image and/or sound using the notification unit 360 and/or the image display unit 324 (step S505), after which the processing of step S503 described above is carried out and the routine returns to step S502.

On the other hand, if there is no problem with the power source 386 (YES in step S504), the routine proceeds to step S506. The system controller 350 then provides a display of the various setting states of the image processing apparatus 300, including the battery remaining power and the status of the memory 320, with image and/or sound using the notification unit 360 and/or the image display unit 324 (step S507).

If there is no reception of a command or of data from the image sensing apparatus 100 (NO in step S508), the routine returns to step S502.

If there is reception of a command or of data from the image sensing apparatus 100 (YES in step S508), and a process of establishing communication between the image sensing apparatus 100 and the image processing apparatus 300 is to be performed in response to the received command or data (YES in step S509), the routine proceeds to step S510. In step S510, a communication establishment process is executed via the communication circuit 330 and the antenna 332 and the routine returns to step S502.

If there is reception of a command or of data from the image sensing apparatus 100 (YES in step S508), and instead of a communication establishment process (NO in step S509) image reception is to be performed in response to the received command or data (step S511), the routine proceeds to step S512. In step S512, a process of receiving image data from the image sensing apparatus 100 through the antenna 332 and the communication circuit 330 and storing image data in the memory 320 is performed. Once the process ends the routine returns to step S502.

Thus, as described above, according to the first embodiment of the present invention, when transferring image data sensed by the image sensing apparatus 100 to the image processing apparatus 300, in the playback (PB mode) a power saving function such as an auto power off or the like is given priority. As a result, when executing the power saving function, if there is image data in the process of being transmitted, the transfer is cut off and the power saving function is executed. On the other hand, in the image sensing REC mode the transfer of image data is given priority, and as a result the power saving function is executed after the transfer of sensed image data is completed. Such an arrangement makes it possible to provide a highly convenient image sensing apparatus that optimally combines the transfer of sensed image data and the execution of the power saving function.

Second Embodiment

Next, a description will be given of a second embodiment of the present invention. In the second embodiment, the operation of the image sensing apparatus 100, in particular the auto power off execution determination process performed in step S112 of FIG. 4 is different from that shown in FIG. 9 in the first embodiment. The rest is the same as the first embodiment, and therefore a description thereof is omitted and the following description concentrates on the operation of the image sensing apparatus 100.

(Operation of the Image Sensing Apparatus)

Figure 11:
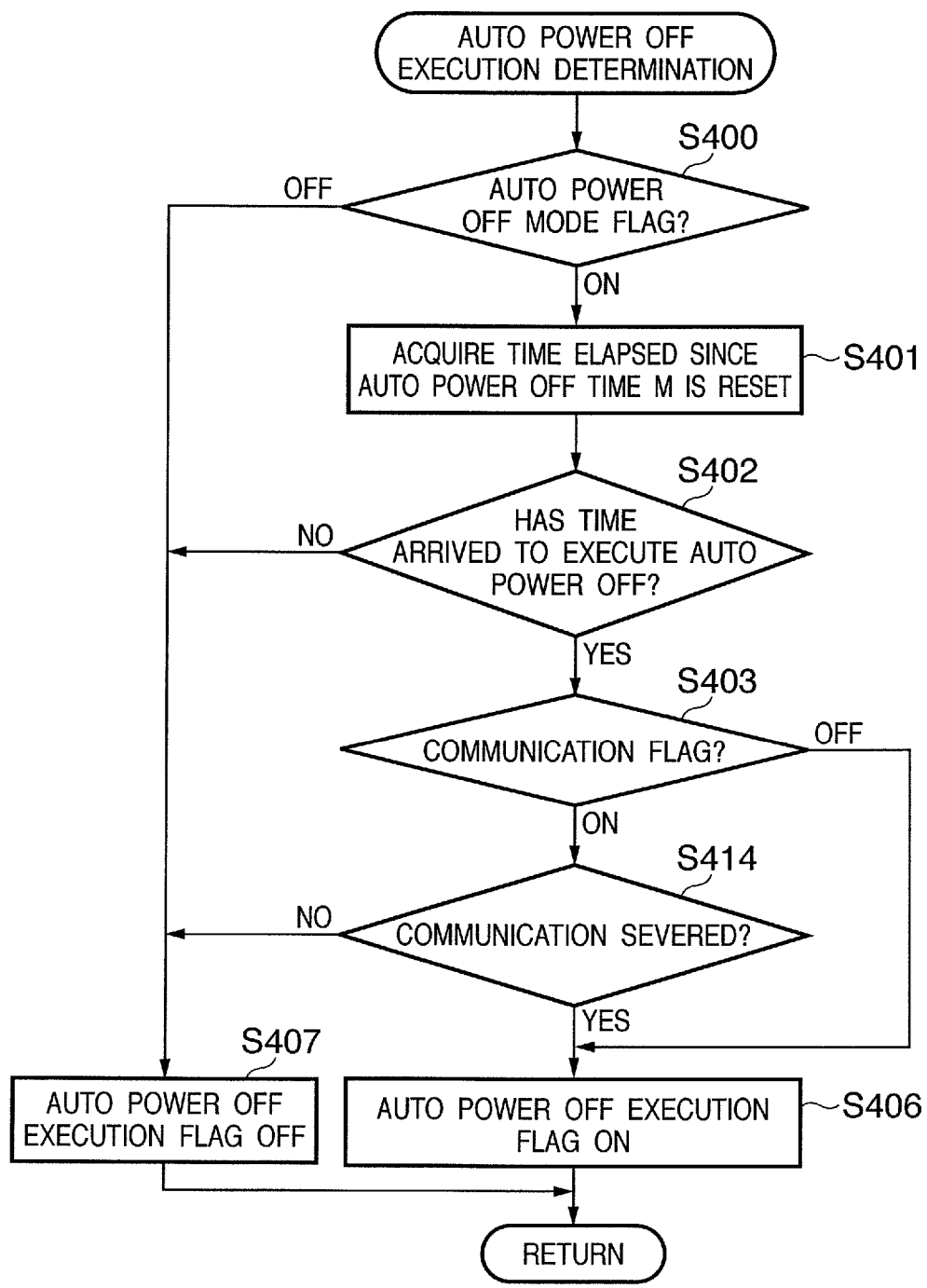
FIG. 11 is a flow chart illustrating an auto power off execution determination processing routine of an image processing apparatus according to a second embodiment of the present invention.

FIG. 11 is a flow chart illustrating in detail the auto power off execution determination process performed in step S112 shown in FIG. 4 of the second embodiment. Processes identical to those shown in FIG. 9 are assigned the same reference numerals and a description thereof is omitted.

In the second embodiment, if it is determined in step S403 that the communication flag is ON, the system controller 50 determines whether or not communication with the image processing apparatus 300 has been interrupted due to a poor radio environment (step S414). If communication between the image sensing apparatus 100 and the image processing apparatus 300 is intact (NO in step S414), the system controller 50 sets the auto power off execution flag stored in the system controller 50 internal memory or in the memory 52 to OFF (step S407).

If communication with the image processing apparatus 300 has been interrupted (YES in step S414), the routine proceeds to step S406. In step S406, the system controller 50 sets the auto power off execution flag stored in the system controller 50 internal memory or in the memory 52 to ON (step S407).

After one of the processes of step S406 and step S407, the system controller 50 ends the auto power off execution determination routine (step S112).

Thus, as described above, according to the second embodiment of the present invention, when transferring image data between the image sensing apparatus 100 and the image processing apparatus 300, an auto power off or other such power saving function is enabled if the communication connection has been severed due to a poor radio environment or the like. In addition, the auto power off or other such power saving function is prohibited if a communication connection has been established. As a result, the auto power off or other such power saving function can be prevented from being executed during the transfer of image data and cutting off the transfer of image data.

Third Embodiment

Next, a description is given of a third embodiment of the present invention. In the third embodiment, the operation of the image sensing apparatus 100, in particular the auto power off execution determination process performed in step S112 of FIG. 4 is different from that shown in FIG. 9 in the first embodiment. The rest is the same as the first embodiment, and therefore a description thereof is omitted and the following description concentrates on the operation of the image sensing apparatus 100.

(Operation of the Image Sensing Apparatus 100)

Figure 12:
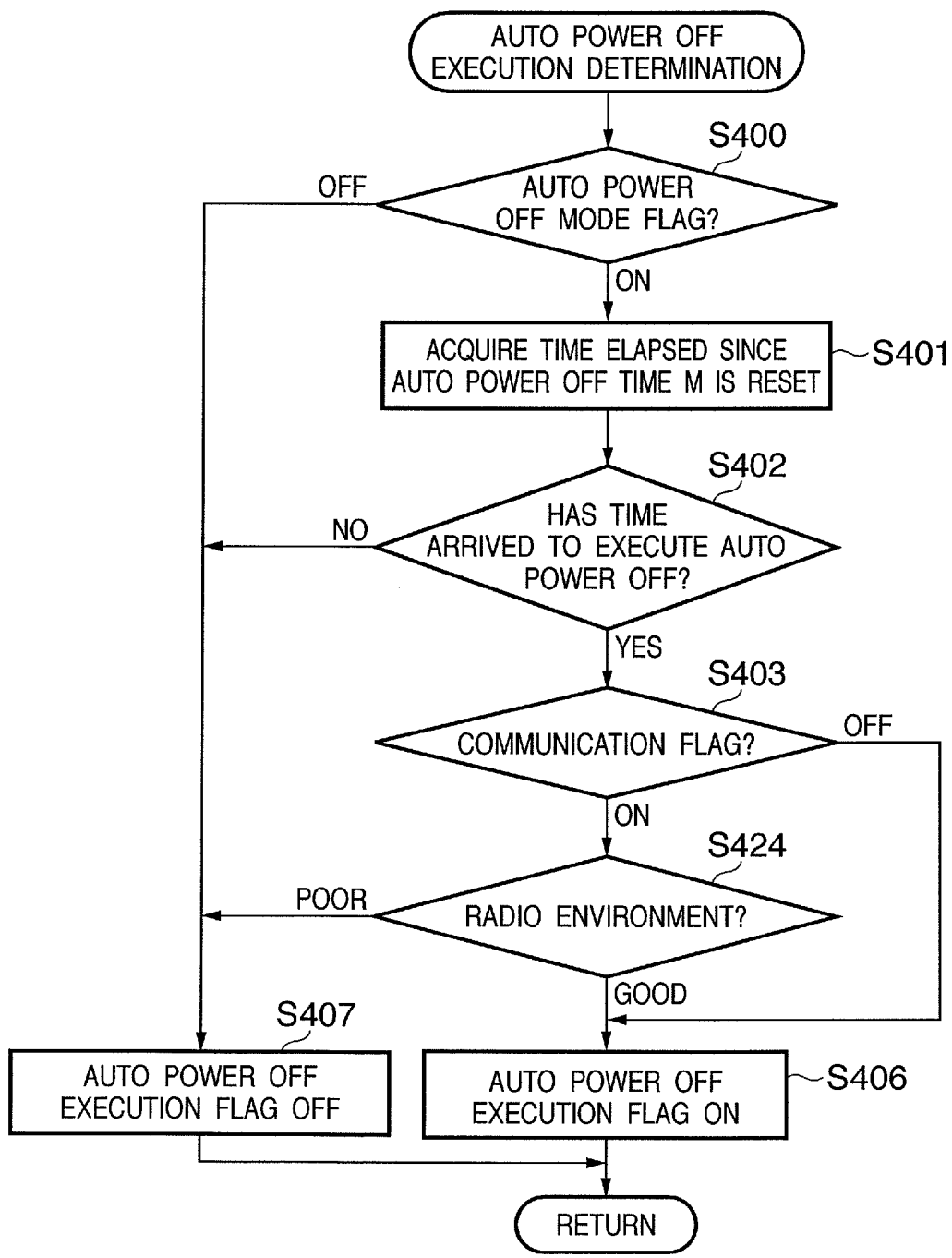
FIG. 12 is a flow chart illustrating an auto power off execution determination processing routine of an image sensing apparatus according to a third embodiment of the present invention.

FIG. 12 is a flow chart illustrating in detail the auto power off execution determination process performed in step S112 shown in FIG. 4 of the third embodiment. Processes identical to those shown in FIG. 9 are assigned the same reference numerals and a description thereof is omitted.

In the third embodiment, if it is determined in step S403 that the communication flag is ON, the system controller 50 determines the state of the communication path between the image sensing apparatus 100 and the image processing apparatus 300 upon carrying out communication. Specifically, the radio environment (electrical field intensity) is determined (step S424). The higher the electrical field intensity, the better the radio environment, and the lower the electrical field intensity, the poorer the radio environment. If the radio environment is poorer than a predetermined electrical field intensity, the system controller 50 sets the auto power off execution flag stored in the system controller 50 internal memory or in the memory 52 to OFF (step S407).

In addition, if the radio environment is better than the predetermined electrical field intensity (YES in step S424), the routine proceeds to step S406. In step S406, the system controller 50 sets the auto power off execution flag stored in the system controller 50 internal memory or in the memory 52 to ON.

After the processes of step S406 and step S407, the auto power off execution determination routine (step S112) is ended.

Thus, as described above, according to the third embodiment of the present invention, the auto power off or other such power saving function is switched between enabled/disabled depending on the radio environment when transferring image data between the image sensing apparatus 100 and the image processing apparatus 300. When the radio environment is poor, the data transfer rate is decreased in the communication. Even under such circumstances in which the radio environment is poor, lengthening the image data transfer time, the transfer does not end. By prohibiting execution of the power saving function when the radio environment is poor, it is possible to prevent the auto power off or other such power saving function from working.

Fourth Embodiment

Next, a description will be given of a fourth embodiment of the present invention. In the fourth embodiment, the operation of the image sensing apparatus 100, in particular the auto power off execution determination process performed in step S112 of FIG. 4 is different from that shown in FIG. 9 in the first embodiment. The rest is the same as the first embodiment, and therefore a description thereof is omitted and the following description concentrates on the operation of the image sensing apparatus 100.

(Operation of the Image Sensing Apparatus)

Figure 13:
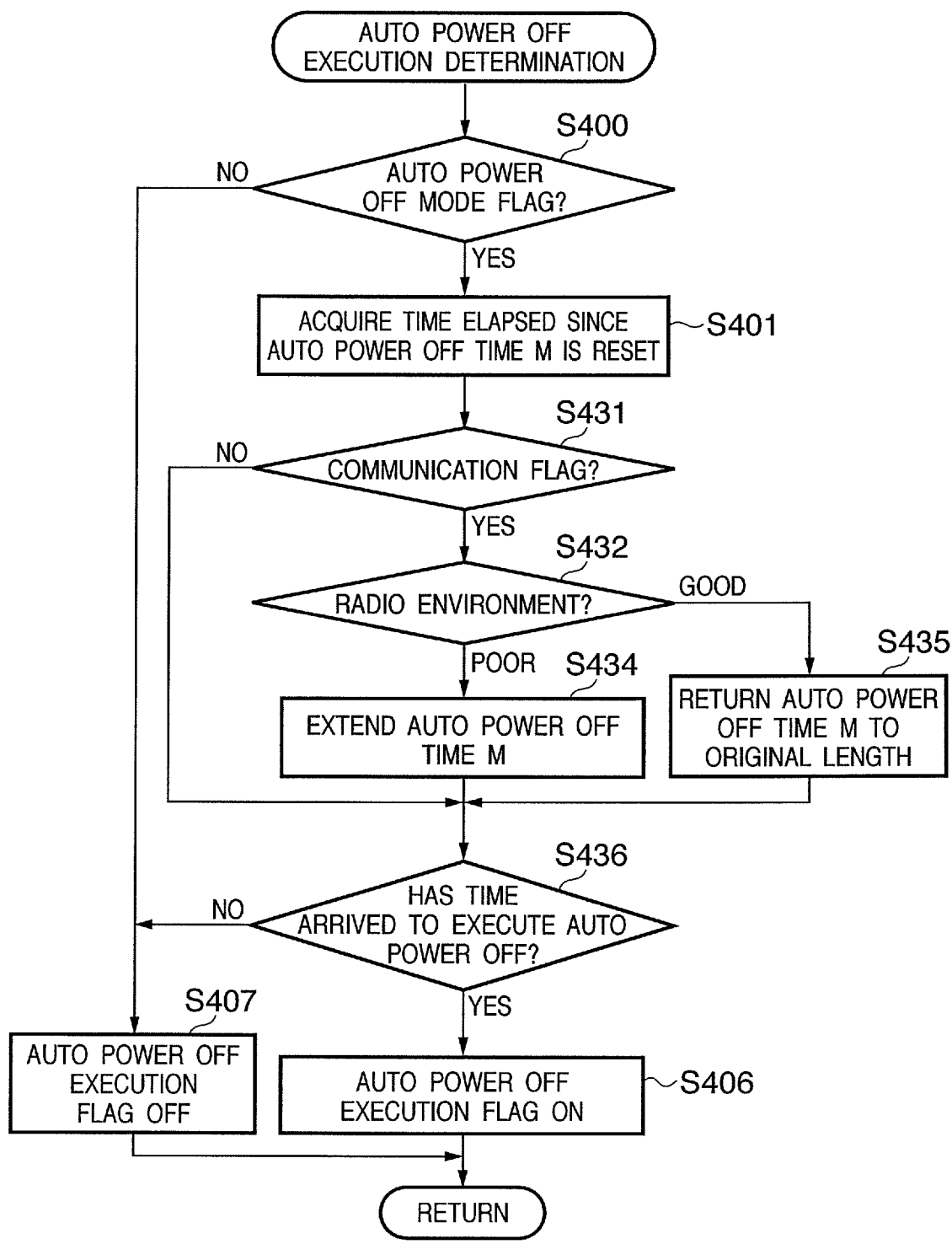
FIG. 13 is a flow chart illustrating an auto power off execution determination processing routine of an image sensing apparatus according to a fourth embodiment of the present invention.

FIG. 13 is a flow chart illustrating in detail the auto power off execution determination process performed in step S112 shown in FIG. 4 of the fourth embodiment. Processes identical to those shown in FIG. 9 are assigned the same reference numerals and a description thereof is omitted.

In the fourth embodiment, an elapsed time after resetting the auto power off time M that is stored in the system controller 50 internal memory or in the memory 52 is obtained using a timer that is either internal to or external to the system controller 50 (step S401), after which the routine proceeds to step S431.

In step S431, the system controller 50 determines the status of the communication flag stored in the system controller 50 internal memory or in the memory 52. Then, if the communication flag is found to be set to OFF, the routine proceeds to step S436. If the communication is found to be set to ON, the routine proceeds to step S432.

In step S432, the system controller 50 determines the radio environment (electrical field intensity) on the side of the image sensing apparatus 100 upon carrying out communication between the image sensing apparatus 100 and the image processing apparatus 300. If the radio environment is poorer than a predetermined electrical field intensity, the routine proceeds to step S434 where the time for comparing the time elapsed since the resetting of the auto power off time M is extended by a predetermined time period, and the routine proceeds to step S436.

If the radio environment is better than the predetermined electrical field intensity (YES in step S432), the routine proceeds to step S435, and the time for comparing the time elapsed since the resetting of the auto power off time M is returned a predetermined time period, and the routine proceeds to step S436.

Then, the system controller 50 determines from the time elapsed since the auto power off time M is reset, whether or not the time has arrived to execute an auto power off operation (step S436).

If the time has arrived to execute the auto power off operation (YES in step S436), the system controller 50 sets the auto power off execution flag stored in the system controller 50 internal memory or in the memory 52 to ON (step S406). On the other hand, if the time has not arrived to execute the auto power off operation (NO in step S436), the system controller 50 sets the auto power off execution flag stored in the system controller 50 internal memory or in the memory 52 to OFF (step S407).

After one of the processes of step S406 and step S407, the auto power off execution determination routine (step S112) is ended.

Thus, as described above, according to the fourth embodiment of the present invention, the predetermined time period for comparing the time elapsed since the resetting of the auto power off time M is changed depending on the radio environment upon transferring image data between the image sensing apparatus 100 and the image processing apparatus 300. When the radio environment is poor, the data transfer rate is decreased to carry out communication. Therefore, the present embodiment extends the waiting time until the implementation of the power saving function when the radio environment is poor and shortens the waiting time until implementation of the power saving function when the radio environment is good. Accordingly, under such circumstances in which the radio environment is poor, which lengthens the image data transfer time and maintains the transfer operation, the cutting off of the transfer process in mid-transfer by the operation of the power saving function can be prevented.

It should be noted that, in the first through fourth embodiments, in order to release or to set the image sensing apparatus 100 power saving mode, for example, the following types of operations may be performed: The power saving mode can be set/released by increasing or decreasing the operation clock of the CPU and/or each block in the image sensing apparatus 100, increasing or decreasing the voltage supplied to the component parts of the image sensing apparatus 100, and increasing or decreasing either the current or power supplied to the component parts of the image sensing apparatus 100.

In addition, the above-described power saving mode may be released or set for an arbitrary block of the image sensing apparatus 100.

Fifth Embodiment

Next, a description will be given of a fifth embodiment of the present invention. The fifth embodiment uses an image sensing apparatus that switches modes between moving image/still image upon executing image sensing operation.

Figure 14:
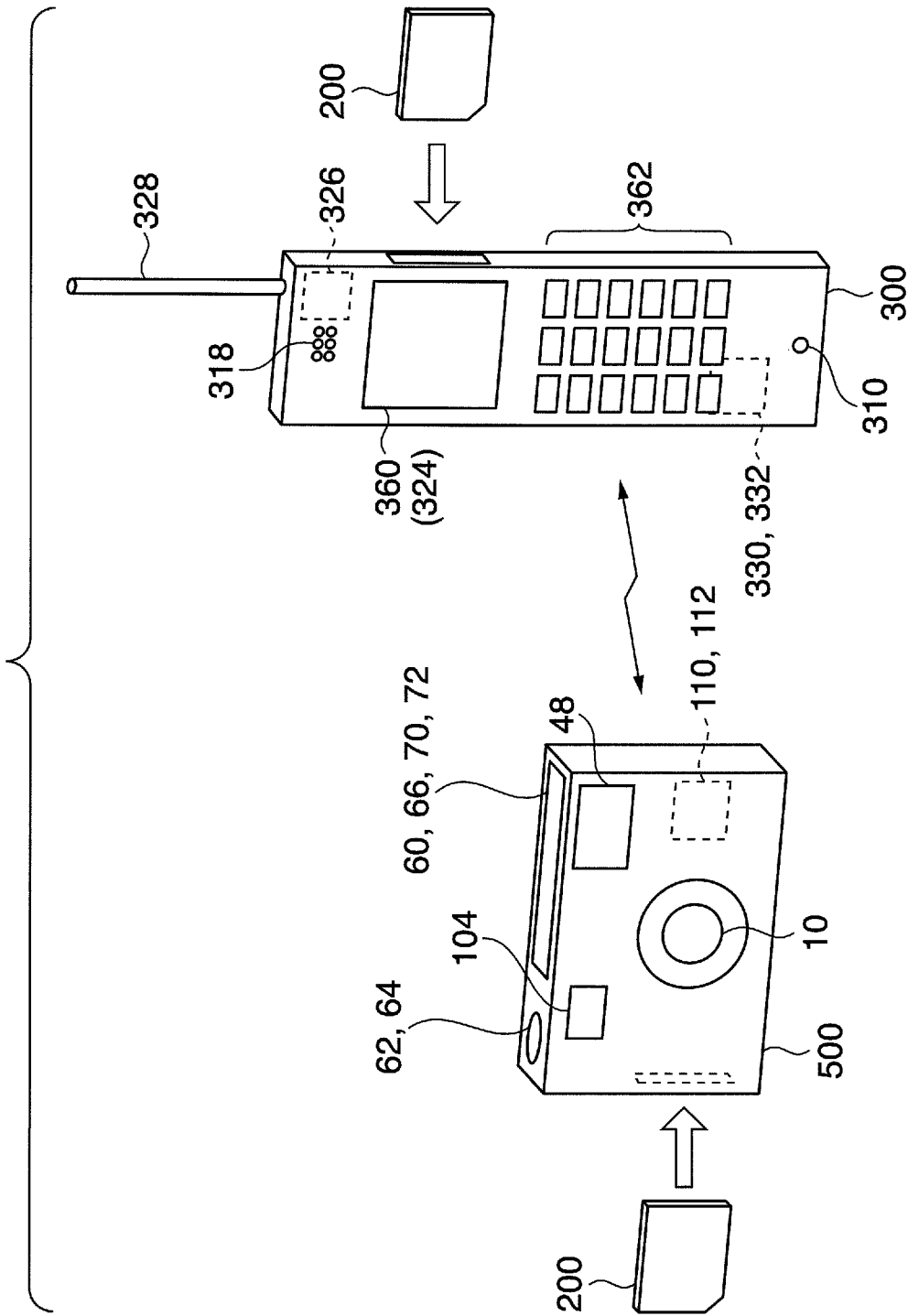
FIG. 14 is a diagram showing the configuration of a system according to a fifth embodiment of the present invention.

FIG. 14 is a diagram showing the overall configuration of the system of the fifth embodiment. As shown in FIG. 14, the fifth embodiment differs from the first embodiment described with reference to FIG. 1, in that an image sensing apparatus 500 is also provided with an I/F for a detachable recording medium 200. Further, that which can be switched and set using a mode dial switch 60 is different from that described in the first embodiment. The remainder of the configuration is identical to that shown in FIG. 1, with such parts assigned the same reference numerals and a description thereof is omitted.

(Configuration of the Image Sensing Apparatus 500)

Figure 15:
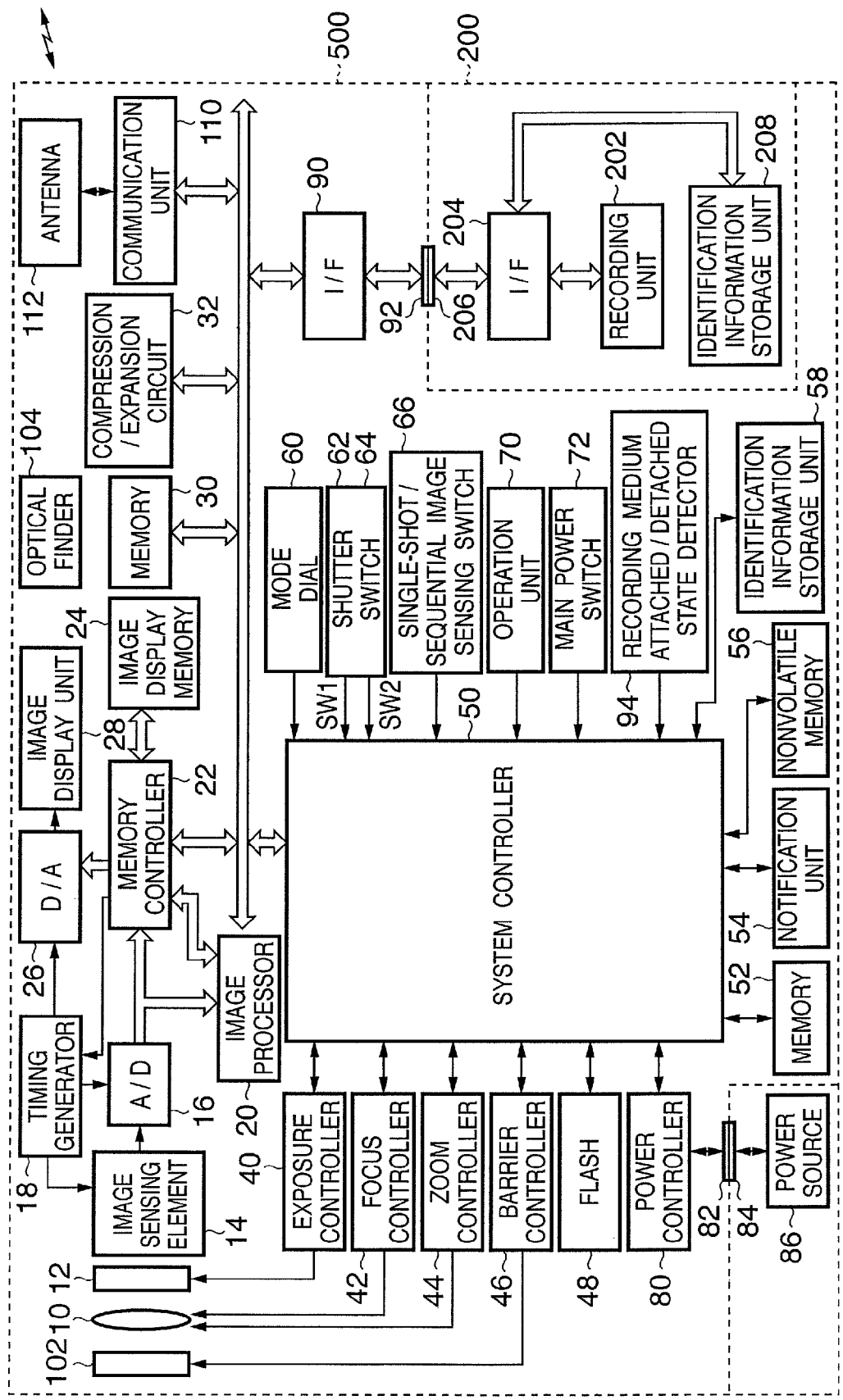
FIG. 15 is a block diagram showing the configuration of an image sensing apparatus according to the fifth embodiment of the present invention.

FIG. 15 is a block diagram showing the configuration of the image sensing apparatus 500 of the fifth embodiment. As shown in FIG. 15, in addition to the configuration shown in FIG. 2 described in the first embodiment, the image sensing apparatus 500 is also provided with an I/F for the recording medium 200.

In FIG. 15, reference numeral 90 designates an interface for a recording medium such as a memory card or a hard disk and the like, and reference numeral 92 designates a connector for connecting to the recording medium such as the memory card or the hard disk and the like. Reference numeral 94 denotes a recording medium attached/detached state detector that detects whether or not the recording medium 200 is attached to the connector 92.

It should be noted that, in the fifth embodiment, the interface and the connector for installing the recording medium form one system. However, the present embodiment may be configured as either a single system of interfaces and connectors for installing a recording medium or a plurality of systems of interfaces and connectors. Moreover, the present embodiment may be configured so as to combine interfaces and connectors of different standards.

As the interfaces and the connectors, those in conformity with the standards of PCMIA (Personal Computer Memory Card International Association) cards or CF (Compact Flash (registered trademark)) cards may be used, as may SD (Secure Digital) cards, MCCs (Multi Media Card) or the like. If those that conform to the standards of PCMIA cards, CF (registered trademark) cards, SD cards or the like are used for the interface 90 and the connector 92, it is possible to connect a variety of communication cards. The communication cards may, for example, be LAN cards or modem cards, USB (Universal Serial Bus) 2 cards, IEEE (Institute of Electrical and Electronic Engineers) 1394 cards and the like, and further, may be P1284 cards, SCSI (Small Computer System Interface) cards, PHS communication cards and the like. By connecting these communication cards, image data and management information attached to the image data can be exchanged with peripheral devices such as other computers, printers and so forth.

In addition, the mode dial switch 60 includes at least a moving image recording mode for recording moving images, a still image recording mode for sensing still images, and a playback mode for playing back recorded moving images and still images.

Structures other than those described above are identical to those shown in FIG. 2, and therefore are given identical reference numerals and a description thereof is omitted.

(Operation of the Image Sensing Apparatus 500)

Next, a description will be given of the operation of the image sensing apparatus 500 having the configuration described above of the fifth embodiment of the present invention, with reference to FIG. 16 through FIG. 22.

Figure 16:
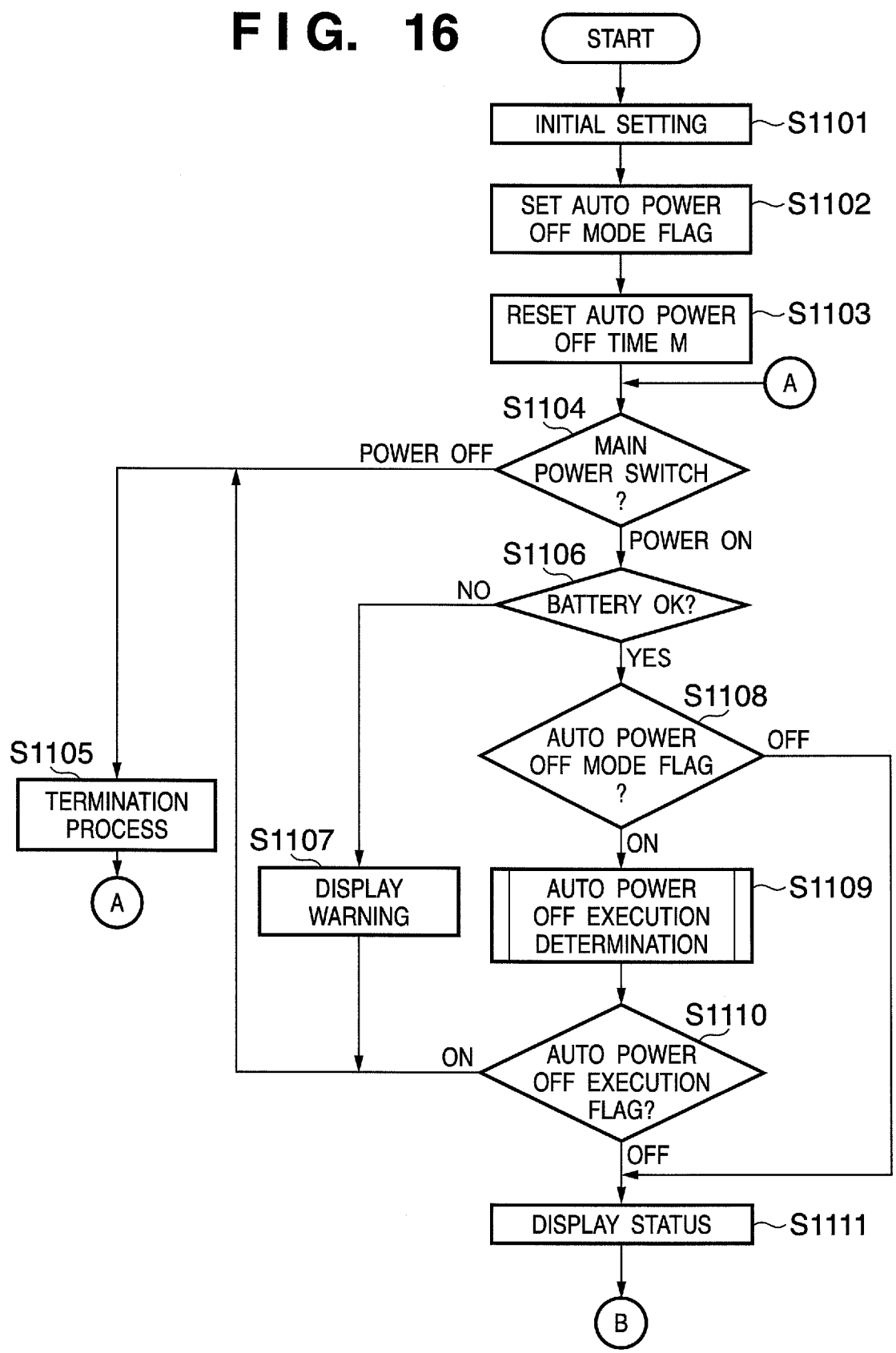
FIG. 16 is a flow chart illustrating a portion of a main routine of the image sensing apparatus according to the fifth embodiment of the present invention.
Figure 17:
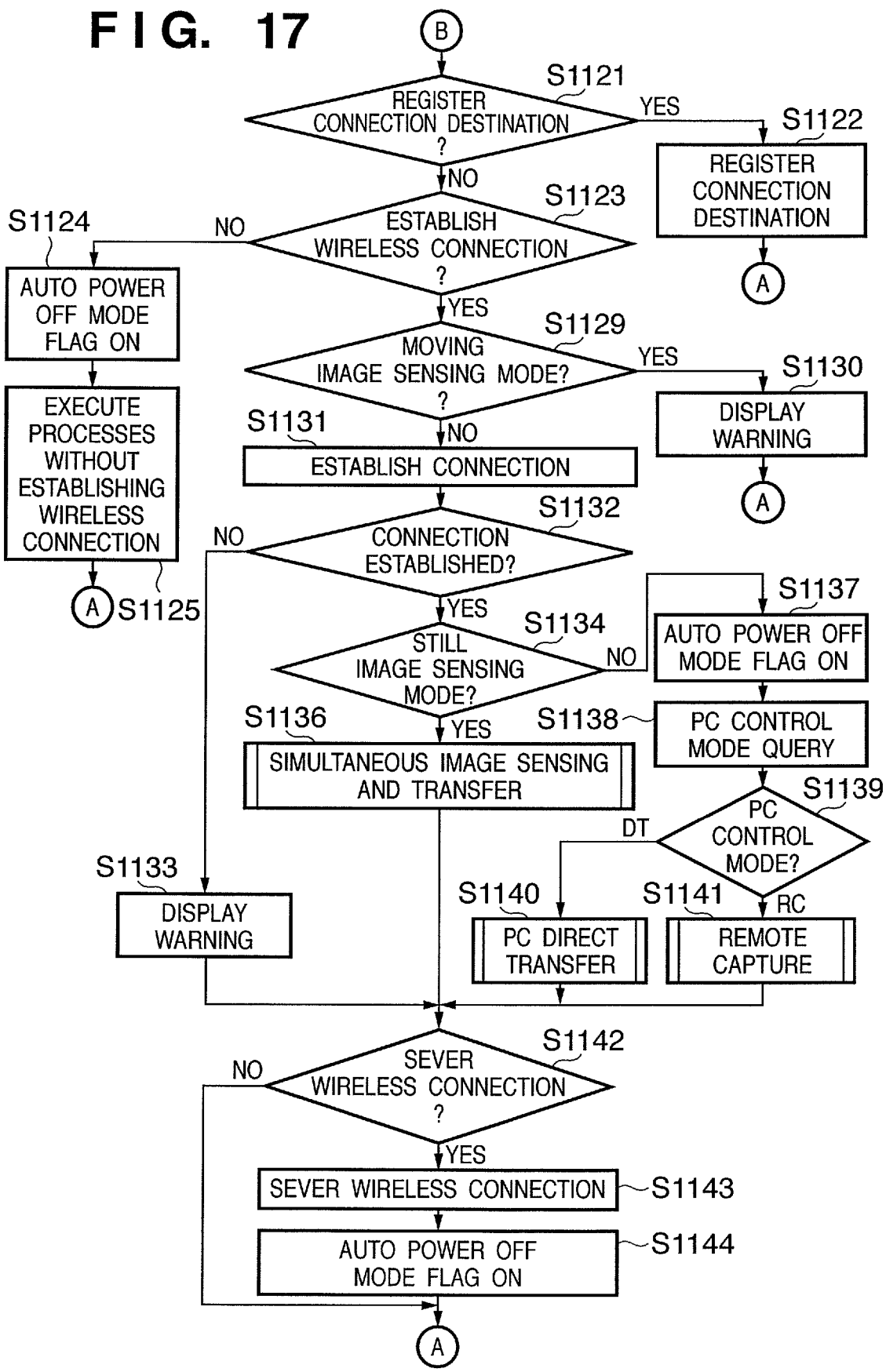
FIG. 17 is a flow chart illustrating a portion of the main routine of the image sensing apparatus according to the fifth embodiment of the present invention.

FIG. 16 and FIG. 17 are flow charts illustrating a main routine of the image sensing apparatus 500 of the fifth embodiment.

In FIG. 16, when the apparatus is supplied with power, by an ON operation using the main power switch 72, the replacement of the battery or the like, the system controller 50 initializes flags, control variables and the like as well as carries out initialization processes for all parts of the image sensing apparatus 500 (step S1101).

Next, the system controller 50 sets the auto power off mode flag to ON and stores that setting in the system controller 50 internal memory or in the memory 52 (step S1102). Further, the system controller 50 resets the auto power off time M, stores the reset auto power off time M in the system controller 50 internal memory or in the memory 52 (step S1103) and proceeds to step S1104.

In step S1104, the system controller 50 confirms the status of the main power switch 72. If the main power switch 72 is set to power OFF, the system controller 50 changes the displays of the display units to an end state, closes the barrier 102 to protect the image sensing part, and records the necessary parameters, set values and set modes, including flags, control variables and so forth, in the nonvolatile memory 56. Further, the system controller 50 performs a predetermined termination process such as cutting off unnecessary power to parts of the image sensing apparatus 500 including the image display unit 28 using the power controller 80 (step S1105), after which the routine returns to step S1104.

On the other hand, if the main power switch 72 is set to power ON, then in step S1106 the system controller 50 determines, using the power controller 80, whether or not the remaining power level or the operating status of the power source 86 composed of a battery or the like poses a problem for the operation of the image sensing apparatus 500. If there is a problem (NO in step S1106), then the system controller 50 provides a predetermined warning by image and/or sound using the notification unit 54 and/or the image display unit 28 (step S1107), after which the system controller 50 performs the process of steps S1105 described above, and returns to step S1104.

On the other hand, if there is no problem with the power source 86 (YES in step S1106), then the system controller 50 determines the status of the auto power off mode flag stored in the system controller 50 internal memory or in the memory 52 (step S1108). If the auto power off mode flag is OFF the routine proceeds to step S1111.

On the other hand, if the auto power off mode flag is ON, the routine proceeds to step S1109. In step S1109, the system controller 50 acquires the elapsed time after resetting of the auto power off time M stored in the system controller 50 internal memory or in the memory 52 and determines whether or not an auto power off operation should be executed. The auto power off execution determination process performed in step S1109 is described in detail later using FIG. 22.

Next, in step S1110 the system controller 50 determines the status of the auto power off execution flag. If the auto power off execution flag is set to ON, then the system controller 50 performs the process of step S1105 described above and the routine returns to step S1104. If the auto power off execution flag is set to OFF, the routine proceeds to step S1111.

Thus, as described above, in the fifth embodiment, when the auto power off mode flag is OFF, that is, when the auto power off mode is not set, the processes of step S1109 and step S1110 are not carried out and therefore the auto power off process is not executed.

In step S1111, the system controller 50 provides a display of the various setting states of the image processing apparatus 500, including the battery remaining capacity and the status of the memory 30, with image and/or sound using the notification unit 54 and/or the image display unit 28, and proceeds to step S1121 shown in FIG. 17.

In step S1121, the system controller 50 determines whether or not a connection registration (pairing) button included in the operation unit 70 has been pressed. If the pairing button has been pressed, the system controller 50 executes a connection registration process with the image processing apparatus 300 through the communication circuit 110, the antenna 112, the antenna 332 and the communication circuit 330 (step S1122). If the button has not been pressed, the routine proceeds to step S1123.

In the connection registration process (step S1122) the image sensing apparatus 500 acquires in advance the necessary wireless parameters of the destination for connecting wirelessly to the image processing apparatus 300 or other such device provided with a wireless communication function, and stores the wireless parameters thus acquired in the system controller 50 internal memory, in the memory 52, or in the nonvolatile memory 56 inside the image sensing apparatus 500. The recording medium 200 may be used to exchange information when acquiring the wireless parameters. In addition, the wireless parameter acquisition exchange may be carried out using a wire interface such as a USB2 or the like, and connecting the image sensing apparatus 500 and the image processing apparatus 300 with a cable. The image sensing apparatus 500 uses the stored wireless parameters when establishing a wireless connection to the image processing apparatus 300 or other such device provided with a wireless function. Once the connection registration process is finished, the routine returns to step S1104.

In step S1123, the system controller 50 determines whether or not the communication start button included in the operation unit 70 has been pressed in order to start wireless connection. If the communication start button has been pressed, the routine proceeds to step S1129. If the communication start button has not been pressed, the routine proceeds to step S1124 and the system controller 50 sets the auto power off mode flag and stores that setting in the system controller 50 internal memory or in the memory 52. Then, the system controller 50 executes a variety of operations of the image sensing apparatus 500 without establishing a wireless connection (step S1125). It should be noted that the process performed in step S1125 is the same as the process performed by the conventional image sensing apparatus, and therefore a description thereof is omitted herein. When the operations are finished the routine returns to step S1104.

On the other hand, in step S1129 the system controller 50 determines the setting status of the mode dial switch 60. If the mode dial switch 60 has been set to the moving image sensing mode, then the system controller 50 provides a predetermined warning by image and/or sound using the notification unit 54 and/or the image display unit 28 (step S1130), and the routine returns to step S1104. This process is carried out for the following reason: The transfer rate may be insufficient for the wireless transfer of moving images during sensing from the image sensing apparatus 500 to the image processing apparatus 300 through the communication circuit 110, the antenna 112, the antenna 332 and the communication circuit 330. Therefore, the system controller 50 performs a predetermined warning when the user attempts to establish a wireless connection in the moving image sensing mode. Such control makes it possible to prevent the user from erroneously establishing a wireless connection in the moving image mode despite the fact that it is impossible to transfer the moving images. Accordingly, incomplete moving image data transfer involving frame drop-out, cut-off, or temporary interruption can be prevented.

On the other hand, if the mode dial switch 60 has been set to the still image sensing mode or to the playback mode (NO in step S1129), then the following operations are performed: Specifically, the system controller 50, through the communication circuit 110, the antenna 112, the antenna 332 and the communication circuit 330, performs a connection establishment process for establishing a state of communication with the image processing apparatus 300 (step S1131). If, as a result of executing the connection establishment process, communication is not established between the image sensing apparatus 500 and the image processing apparatus 300 (NO in step S1132), the routine proceeds to step S1133. The system controller 50 then provides a predetermined warning with image and/or sound using the notification unit 54 and/or the image display unit 28, after which the routine proceeds to step S1142.

If, as a result of executing the connection establishment process, communication is established between the image sensing apparatus 500 and the image processing apparatus 300 (YES in step S1132), then the system controller 50 determines the setting status of the mode dial switch 60 (step S1134).

If the mode dial switch 60 has been set to the still image sensing mode, the system controller 50 notifies the image processing apparatus 300 through the communication circuit 110, the antenna 112, the antenna 332 and the communication circuit 330 that the operating mode is the still image sensing mode, and then executes a simultaneous image sensing and transfer process (step S1136). The simultaneous image sensing and transfer process (step S1136) will be described in detail later using FIG. 18 and FIG. 19.

Once the simultaneous image sensing and transfer process is finished the routine proceeds to step S1142.

On the other hand, if the mode dial switch 60 has been set to the playback mode (NO in step S1134), the system controller 50 sets the auto power off mode flag to ON and stores that setting in the system controller 50 internal memory or in the memory 52 (step S1137). Further, through the communication circuit 110, the antenna 112, the antenna 332 and the communication circuit 330, the system controller 50 notifies the image processing apparatus 300 that the operating mode is the playback mode and queries the image processing apparatus 300 for a PC control mode (step S1138).

If the results of the query indicate that a PC direct transfer mode (DT) has been selected at the image processing apparatus 300 (DT in step S1139), the system controller 50 executes a PC direct transfer process (step S1140). The PC direct transfer process (step S1140) is described in detail later using FIG. 20.

Once the PC direct transfer process is finished, the routine proceeds to step S1142.

If the results of the query in step S1138 indicate that a remote capture mode (RC) has been selected at the image processing apparatus 300 (RC in step S1139), the system controller 50 executes a remote capture process (step S1141). The remote capture process (step S1141) is described in detail later using FIG. 21.

Once the remote capture process is finished, the routine proceeds to step S1142.

In step S1142, the system controller 50 determines whether or not the communication end button included in the operation unit 70 has been pressed in order to sever the wireless connection. If the communication end button has not been pressed, the routine returns to step S1104.

If the communication end button has been pressed, the system controller 50 performs a process of severing wireless communication with the image processing apparatus 300 via the communication circuit 110, the antenna 112, the antenna 332 and the communication circuit 330 (step S1143). The system controller 50 then sets the auto power off mode flag and stores the new setting in the system controller 50 internal memory or in the memory 52 (step S1144) and returns to step S1104.

Figure 18:
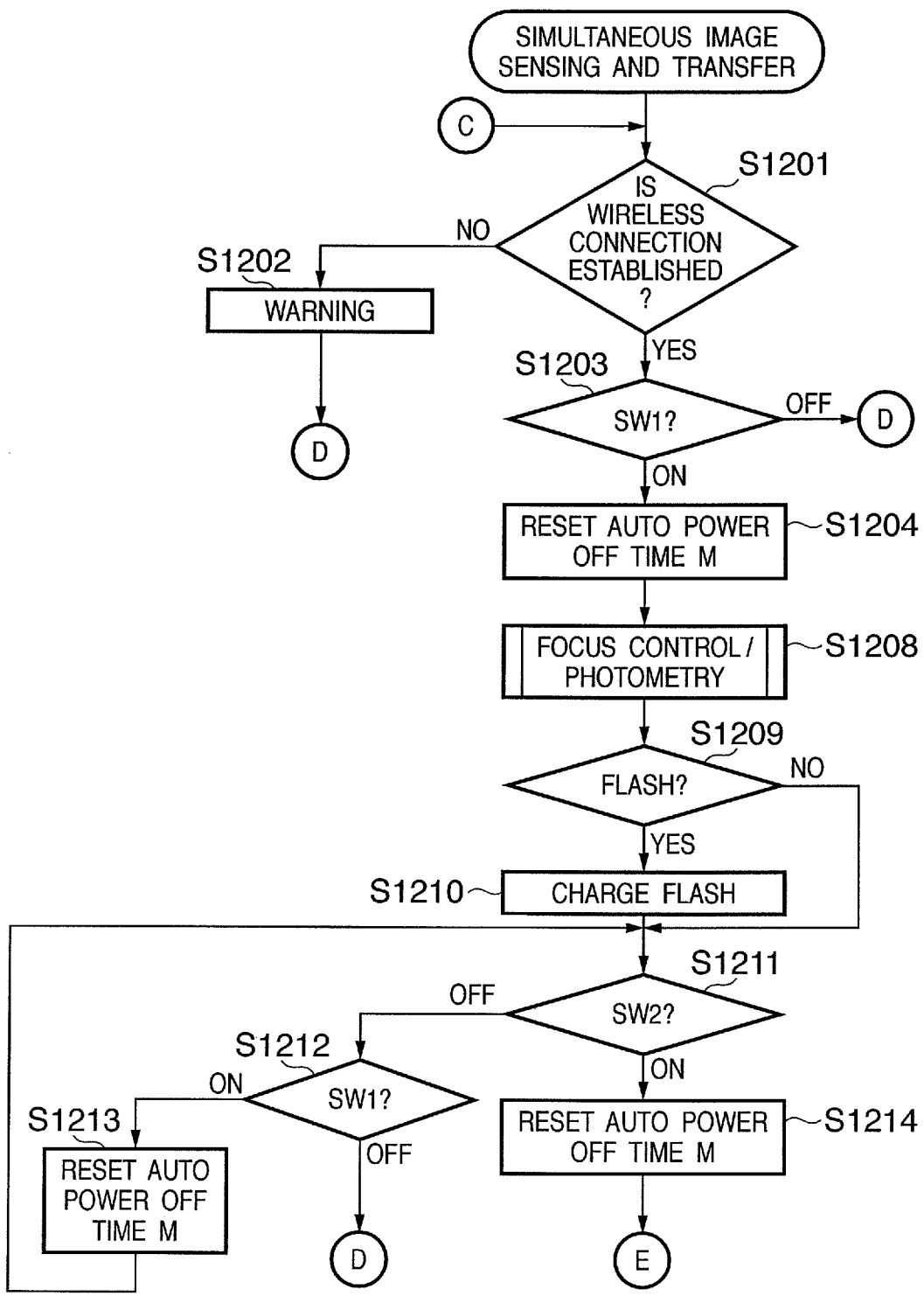
FIG. 18 is a flow chart illustrating a simultaneous image sensing and transfer processing routine of the image sensing apparatus according to the fifth embodiment of the present invention.
Figure 19:
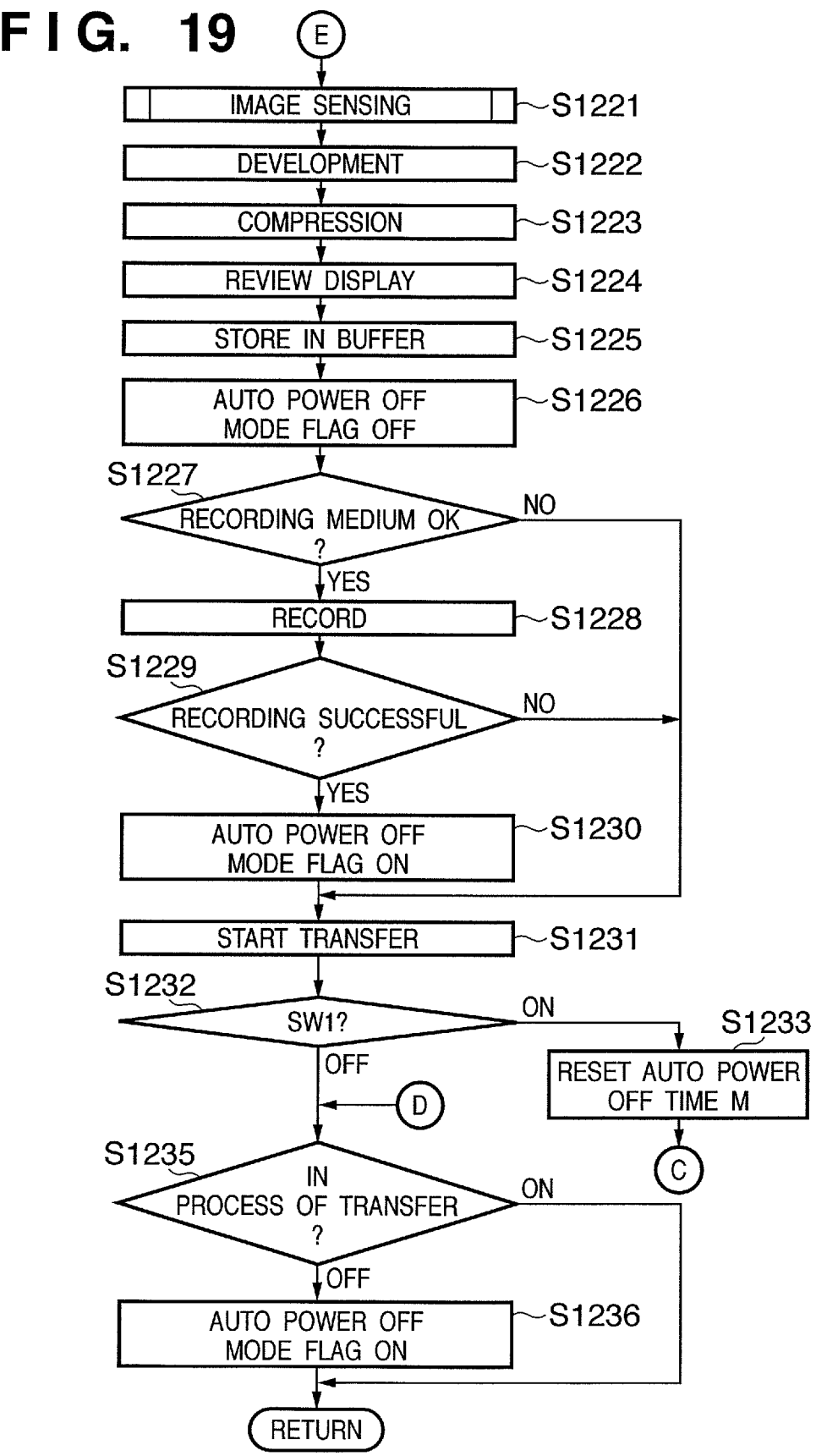
FIG. 19 is a flow chart illustrating a simultaneous image sensing and transfer processing routine of the image sensing apparatus according to the fifth embodiment of the present invention.

FIG. 18 and FIG. 19 are flow charts illustrating in detail the simultaneous image sensing and transfer process of step S1136 shown in FIG. 17.

In step S1201, the system controller 50, via the communication circuit 110, the antenna 112, the antenna 332 and the communication circuit 330, confirms the state of communication with the image processing apparatus 300. If a connection that had been established is severed, either because the radio environment is poor, the communication end button included in the operation unit 70 has been pressed or of some other similar reason, and wireless communication is not established with the image processing apparatus 300, the routine proceeds to step S1202. The system controller 50 then provides a predetermined warning with an image and/or sound using the notification unit 54 and/or the image display unit 28, after which the routine proceeds to step S1235 shown in FIG. 19.

If wireless communication with the image processing apparatus 300 has been established, the routine proceeds to step S1203 and the system controller 50 confirms the status of the shutter switch SW1. If the shutter switch SW1 has not been pressed, the routine proceeds to step S1235 shown in FIG. 19.

If the shutter switch SW1 has been pressed (ON in step S1203), the system controller 50 resets the auto power off time M and stores the reset auto power off time M in the system controller 50 internal memory or in the memory 52 (step S1204).

The system controller 50 performs focus control processing and focuses the image sensing lens 10 on the subject, performs photometry processing and determines the f number and the shutter speed, and performs white balance processing and matches color temperature (step S1208). Depending on the results of the photometry, if necessary the system controller 50 sets the flash as well. It should be noted that, in the focus control/photometry processing, the system controller 50 confirms the statuses of an image sensing start flag and/or an AE lock flag and/or a white balance mode setting flag stored in the system controller 50 internal memory or in the memory 52. Then, depending on these statuses, the system controller 50 determines whether or not to execute AE control and/or AWB control, and performs each individual process according to the results of that determination. The focus control/photometry processing performed here is the same as the process shown in FIG. 7, and therefore a description thereof is omitted.

Once focus control/photometry processing (step S1208) is finished, the system controller 50 determines the state of the flash flag stored in the system controller 50 internal memory or in the memory 52 (step S1209). If the flash flag has been set, then the system controller 50 charges the flash (step S1210) and proceeds to step S1211. If the flash flag has been released, the routine proceeds directly to step S1211.

If the shutter switch SW2 has not been pressed (OFF in step S1211), and further, if the shutter switch SW1 has been released as well (OFF in step S1212), the system controller 50 proceeds to step S1235 shown in FIG. 19. If the shutter switch SW1 has remained pressed (ON in step S1212), the system controller 50 resets the auto power off time M and stores the reset auto power off time M in the system controller 50 internal memory or in the memory 52 (step S1213), and returns to step S1211.

If the shutter switch SW2 has been pressed (ON in step S1211), the system controller 50 resets the auto power off time M, stores the reset auto power off time M in the system controller 50 internal memory or in the memory 52 (step S1214) and proceeds to step S1221 shown in FIG. 19.

In step S1221, the system controller 50 executes an image sensing process. In the image sensing process, sensed image data is written to the memory 30 either through the image sensing element 14, the A/D converter 16, the image processor 20 and the memory controller 22, or via the memory controller 22 directly from the A/D converter 16. The image sensing process performed here is the same as the process shown in FIG. 8, and thus a description thereof is omitted.

Next, the system controller 50, using the memory controller 22 and as necessary the image processor 20, reads out the image data written to the memory 30 and executes development processing that performs a variety of processes on the image data (step S1222). Further, after performing an image compression process in accordance with the set mode using the compression/expansion circuit 32 as necessary (step S1223), the image display unit 28 provides a review display of the sensed image data that has undergone development processing in step S1222 (step S1224). The image data, which has undergone predetermined processing such as development processing, compression processing and the like, is then stored a buffer area secured in the memory 30 (step S1225), and the routine proceeds to step S1226.

In step S1226, the auto power off mode flag is set to OFF, the new setting is stored in the system controller 50 internal memory or in the memory 52, and the routine proceeds to step S1227.

In step S1227, the system controller 50 determines whether or not the recording medium 200 is attached and acquires management information for the image data recorded on the recording medium 200. The system controller 50 then determines whether or not the operating status of the recording medium 200 poses a problem for the operation of the image sensing apparatus 500, in particular the operations of recording and playing back image data to and from the recording medium 200. If the results of the determination indicate that there is a problem (NO in step S1227), the routine proceeds to step S1231.

On the other hand, if there is no problem with the operating status of the recording medium 200 (YES in step S1227), the system controller 50 records the image data stored in the buffer area to the recording medium 200 via the interface 90 and the connector 92 (step S1228). In step S1229, when it is confirmed that the recording process has ended successfully and the image data has been recorded on the recording medium 200, in step S1230 the auto power off mode flag is set to ON and the routine proceeds to step S1231. On the other hand, if the recording process has failed, the routine proceeds as is to step S1231.

In step S1231, the system controller 50 starts to transfer image data from the buffer area secured in the memory 30 to the image processing apparatus 300 via the communication circuit 110 and the antenna 112.

Next, the system controller 50 confirms the status of the shutter switch SW1 (step S1232). If the shutter switch SW1 has been pressed, the system controller 50 resets the auto power off time M, stores the reset auto power off time M in the system controller 50 internal memory or in the memory 52 (step S1233) and returns to step S1201.

If the shutter switch SW1 has not been pressed, in step S1235 the system controller 50 determines whether or not image data is still being transferred. If image data is still being transferred, such transfer is allowed to proceed as is. If image data is not being transferred, the system controller 50 sets the auto power off mode flag to ON and finishes the simultaneous image sensing and transfer process routine (step S1136).

Thus, as described above, when image data sensed by the image sensing apparatus 500 is to be recorded on the recording medium 200 as well as transferred to the image processing apparatus 300, the execution of an auto power off or other such power saving function is permitted if it is determined that image data can be recorded on the recording medium 200. Then, by enabling the execution of the auto power off or other such power saving function after the recording of image data in that state, the battery drive time of the image sensing apparatus 500 can be extended. In addition, it is also possible to prevent the loss of sensed image data even if the transfer process is cut off during the transfer of image data, for example.

On the other hand, when image data sensed by the image sensing apparatus 500 is to be recorded on the recording medium 200 as well as transferred to the image processing apparatus 300, the execution of an auto power off or other such power saving function is prohibited if it is determined that image data cannot be recorded on the recording medium 200. Then, by carrying out the transfer of image data in that state, it is possible to prevent the loss of sensed image data by the interruption of the transfer process for the purpose of executing the auto power off or other such power saving function during mid-transfer of image data.

It should be noted that, according to the process described above, it is possible to execute continuously a series of operations for the purpose of preventing the loss of sensed image data like the following: First, in a simultaneous image sensing and transfer process state, in which image data that the image sensing apparatus 500 has sensed is transferred to the image processing apparatus 300 while being recorded on the recording medium 200, the auto power off process is enabled and the battery drive time is extended. If the recording medium 200 becomes full during the recording of the image data to the recording medium 200, the execution of the auto power off process during the transfer of image data to the image processing apparatus 300 is prohibited.

Figure 20:
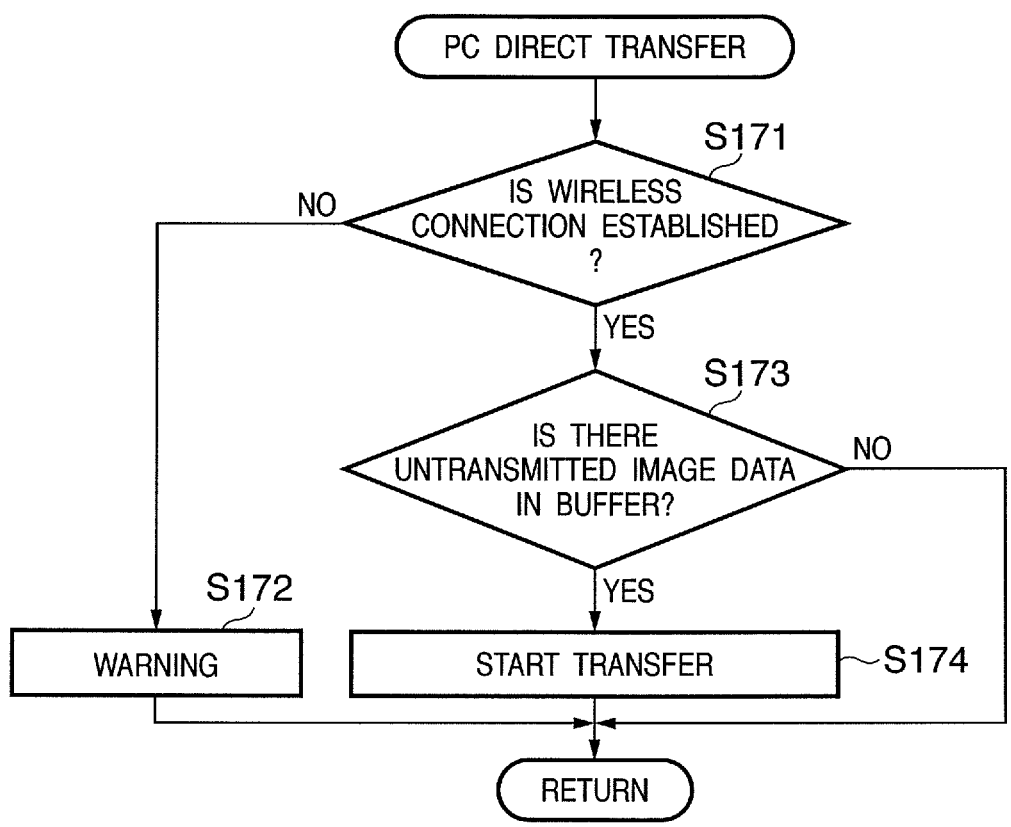
FIG. 20 is a flow chart illustrating a PC direct transfer processing routine of the image sensing apparatus according to the fifth embodiment of the present invention.

FIG. 20 is a flow chart illustrating in detail the PC direct transfer process of step S1140 shown in FIG. 17.

In step S171, the system controller 50 confirms the state of communication with the image processing apparatus 300 via the communication circuit 110, the antenna 112, the antenna 332 and the communication circuit 330. If a connection that had been established has been severed, because the radio environment is poor or because the communication end button included in the operation unit 70 has been pressed or for some other similar reason, and if a wireless connection with the image processing apparatus 300 is not established, the routine proceeds to step S172. The system controller 50, after providing a predetermined warning with image and/or sound using the notification unit 54 and/or the image display unit 28, then ends the PC direct transfer processing routine (step S1140).

If a wireless connection with the image processing apparatus 300 has been established, the routine proceeds to step S173.

In step S173, the system controller 50 determines whether or not there are image data or any file to be transferred from the image sensing apparatus 500 to the image processing apparatus 300 on the recording medium 200 and/or in the buffer area secured in the memory 30. If there are no image data or a file to be transferred, the system controller 50 ends the PC direct transfer processing routine (step S1140). On the other hand, if there is image data or any file to be transferred, the routine proceeds to step S174.

In step S174, the system controller 50 transfers image data or a file/files to be transferred to the image processing apparatus 300 from the recording medium 200 and/or the buffer area secured in the memory 30. The system controller 50 starts transferring a file/files via the connector 92, the interface 90, the communication circuit 110 and the antenna 112 if the a file/files are transferred from the recording medium 200, or via the communication circuit 110 and the antenna 112 if the file/files are transferred from the buffer area of the memory 30. The routine then ends the PC direct transfer processing routine (step S1140) and returns to step S1142.

Figure 21:
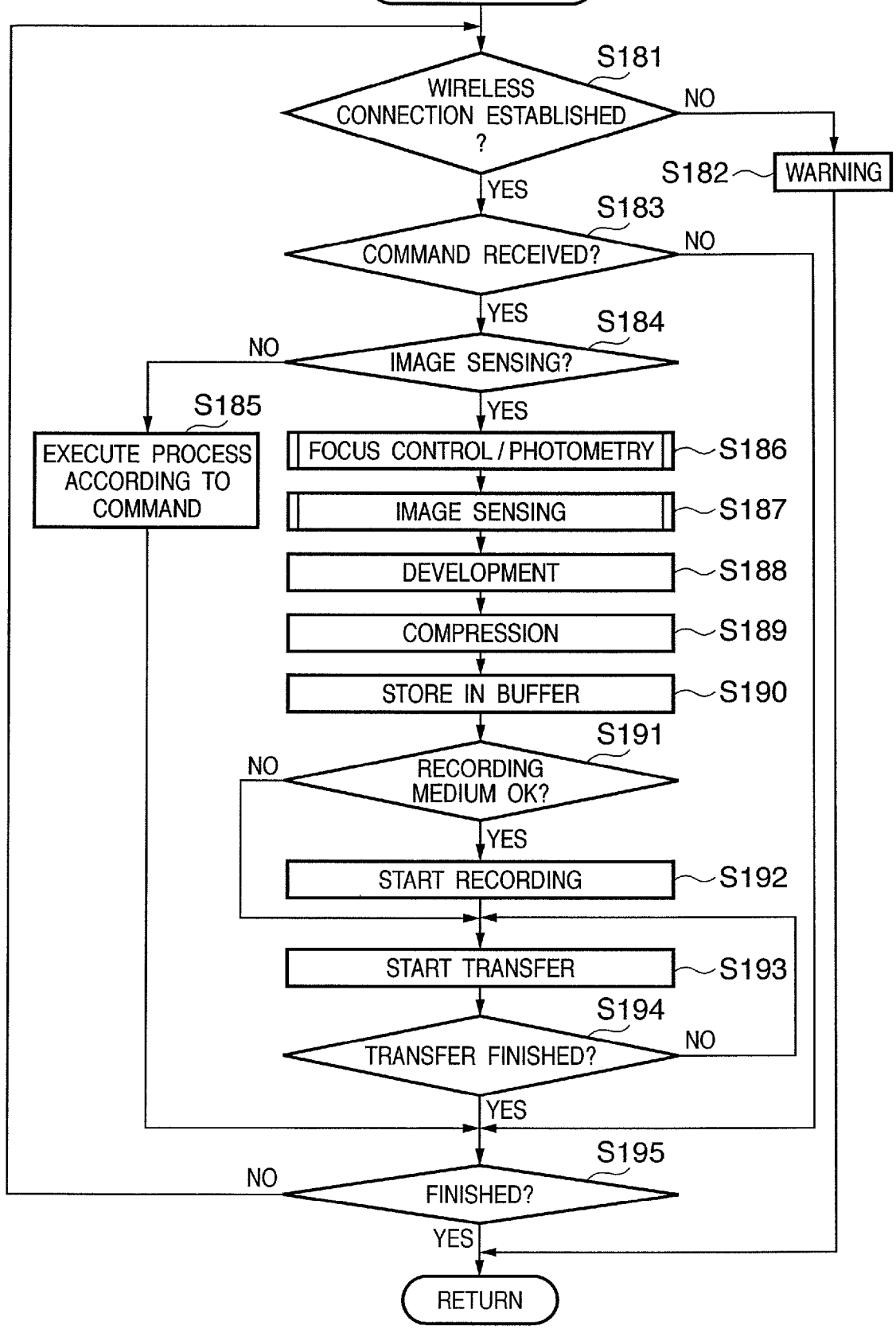
FIG. 21 is a flow chart illustrating a remote capture processing routine of the image sensing apparatus according to the fifth embodiment of the present invention.

FIG. 21 is a flow chart illustrating in detail the remote capture process of step S1141 shown in FIG. 17.

In step S181, the system controller 50 confirms the state of communication with the image processing apparatus 300 via the communication circuit 110, the antenna 112, the antenna 332 and the communication circuit 330. If a connection that had been established has been severed, because the radio environment is poor or because the communication end button included in the operation unit 70 has been pressed or for some other similar reason, and if a wireless connection with the image processing apparatus 300 is not established, the routine proceeds to step S182. The system controller 50, after providing a predetermined warning with image and/or sound using the notification unit 54 and/or the image display unit 28, then ends the remote capture processing routine (step S1141).

If a wireless connection with the image processing apparatus 300 has been established, the routine proceeds to step S183, the system controller 50 determines whether or not it has received a command from the image processing apparatus 300 via the communication circuit 330, the antenna 332, the antenna 112 and the communication circuit 110.

If no command from the image processing apparatus 300 has been received (NO in step S183), the routine proceeds to step S195. If a command from the image processing apparatus 300 has been received (YES in step S183), the system controller 50 determines the type of the command. If the received command is a command that relates to anything other than image sensing (NO in step S184), the system controller 50 executes processing in accordance with the command (step S185) and the routine proceeds to step S195. On the other hand, if the received command is a command that relates to image sensing (YES in step S184), the routine proceeds to step S186.

The system controller 50 performs focus control processing and focuses the image sensing lens 10 on the subject, performs photometry processing and determines the f number and the shutter speed, and performs white balance processing and matches the color temperature (step S186). Depending on the results of the photometry, if necessary the system controller 50 also sets the flash as well. It should be noted that, in the focus control/photometry processing, the system controller 50 confirms the statuses of an image sensing start flag and/or an AE lock flag and/or a white balance mode setting flag stored in the system controller 50 internal memory or in the memory 52. Then, depending on these statuses, the system controller 50 determines whether or not to execute AE control and/or AWB control, and performs each individual process according to the results of that determination. The focus control/photometry processing performed here is the same as the process shown in FIG. 7, and thus a description thereof is omitted.

Once the focus control/photometry processing (step S186) is finished, the system controller 50 executes an image sensing process (step S187). The image sensing process writes sensed image data to the memory 30, either through the image sensing element 14, the A/D converter 16, the image processor 20 and the memory controller 22, or directly through the memory controller 22 from the A/D converter 16. The image sensing process is identical to the process shown in FIG. 8, and thus a description thereof is omitted herein.

Next, the system controller 50, using the memory controller 22 and as necessary the image processor 20, reads out the image data written to the memory 30 and executes development processing that performs a variety of processes on the image data (step S188). Further, after performing an image compression process in accordance with the set mode using the compression/expansion circuit 32 as necessary (step S189), the routine proceeds to step S190.

In step S190, the system controller 50 stores image data that has undergone development processing as well as such predetermined processing as compression processing in a buffer area secured in the memory 30 and proceeds to step S191.

In step S191, the system controller 50 determines whether or not the recording medium 200 is attached and acquires management information for the image data recorded on the recording medium 200. The system controller 50 then determines whether or not the operating status of the recording medium 200 poses a problem for the operation of the image sensing apparatus 500, in particular the operations of recording and playing back image data to and from the recording medium 200. If there is a problem, the routine proceeds directly to step S193. If there is no problem, the system controller 50 starts to record image data from the buffer area secured in the memory 30 to the recording medium 200 via the interface 90 and the connector 92 (step S192) and proceeds to step S193.

In step S193, the system controller 50 transfers image data sensed and stored in the buffer area secured in the memory 30 to the image processing apparatus 300 via the communication circuit 110 and the antenna 112. Once the transfer of the image data to the image processing apparatus 300 is definitely finished (YES in step S194), the routine proceeds to step S195.

If the need to interrupt remote capture processing has arisen due to circumstances on the image sensing apparatus 500 side (YES in step S195), the system controller 50 ends the remote capture processing routine (step S1141).

If no need to interrupt remote capture processing has arisen due to circumstances on the image sensing apparatus 500 side (NO in step S195), the routine returns to step S181 and the system controller 50 awaits an instruction according to a new command from the image processing apparatus 300 in step S183 if wireless connection has been established.

Figure 22:
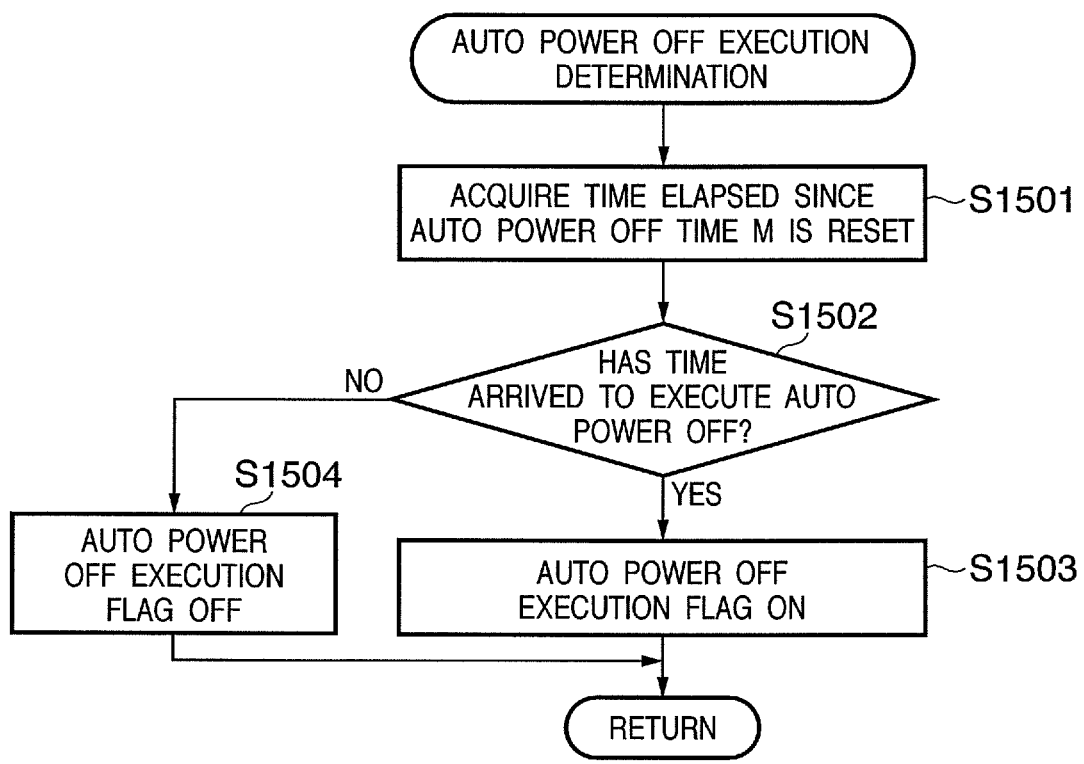
FIG. 22 is a flow chart illustrating an auto power off execution determination processing routine of the image sensing apparatus according to the fifth embodiment of the present invention.

FIG. 22 is a flow chart illustrating in detail the auto power off execution determination process of step S1109 shown in FIG. 16.

The system controller 50 acquires an elapsed time after the setting of the auto power off time M stored in the system controller 50 internal memory or in the memory 52 from a timer that is either internal to or external to the system controller 50 (step S1501). Then, from the acquired time elapsed after the setting of the auto power off time M, the system controller 50 determines whether or not a time has arrived at which the auto power off operation should be executed (step S1502).

If the time has not arrived at which the auto power off operation should be executed (NO in step S1502), the system controller 50 releases the auto power off execution flag stored in the system controller 50 internal memory or in the memory 52 (step S1504). Then the auto power off execution determination routine (step S1109) is ended.

On the other hand, if the time has arrived at which the auto power off operation should be executed (YES in step S1502), the system controller 50 sets the auto power off execution flag stored in the system controller 50 internal memory or in the memory 52 (step S1503). Then the auto power off execution determination routine (step S1109) is ended.

(Operation of the Image Processing Apparatus)

Next, a description will be given of the operation of the image processing apparatus 300 of the fifth embodiment of the present invention, with reference to FIG. 23.

Figure 23:
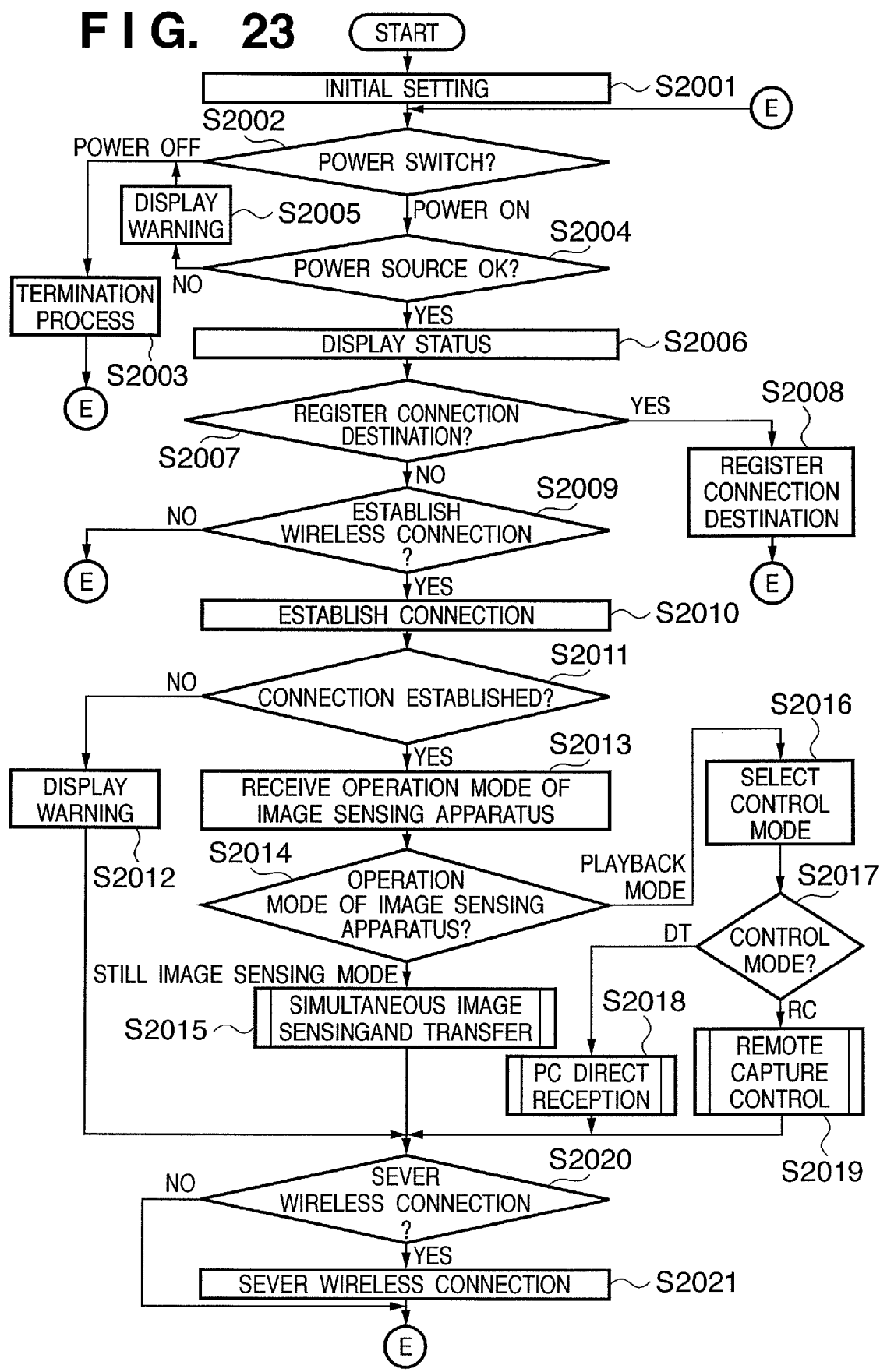
FIG. 23 is a flow chart illustrating a main routine of an image processing apparatus according to the fifth embodiment of the present invention.

In FIG. 23, as the apparatus is provided with power by the replacement of the battery or the like, the system controller 350 initializes flags, control variables and the like and also initializes the component parts of the image processing apparatus 300 (step S2001).

Next, the system controller 350 confirms the status of the power switch included in the operation unit 362 (step S2002). If the power switch is set to OFF, the system controller 350 changes the display of the display units to an end state and stores the necessary parameters, including flags, control variables and the like, as well as set values and set modes, to the nonvolatile memory 354. The system controller 350, after performing a predetermined termination process that cuts off unneeded power to parts of the image processing apparatus 300 including the image display unit 324 through the power controller 380 (step S2003), returns to step S2002. If in step S2002 the power switch contained in the operation unit 362 is set to power ON, the routine proceeds to step S2004.

In step S2004, the system controller 350, through the power controller 380, determines whether or not the remaining power level and the operating status of the power source 386 comprising a battery or the like poses a problem for the operation of the image processing apparatus 300. If there is a problem (NO in step S2004), the system controller 350 issues a predetermined warning by an image and/or sound using the notification unit 360 and/or the image display unit 324 (step S2005), after which the processing of step S2003 described above is carried out and the routine returns to step S2002.

On the other hand, if there is no problem with the power source 386 (YES in step S2004), the routine proceeds to step S2006. Then, using the notification unit 360 and/or the image display unit 324, the system controller 350 provides a display of the various setting states of the image processing apparatus 300, including the battery remaining power and the status of the memory 320 using image and/or sound, after which the routine proceeds to step S2007.

The system controller 350 determines whether or not a connection registration (pairing) button included in the operation unit 70 has been pressed (step S2007). If the connection registration (pairing) button has been pressed (YES in step S2007), the system controller 350 executes a connection registration process with the image sensing apparatus 500 through the communication circuit 330, the antenna 332, the antenna 112 and the communication circuit 110 (step S2008).

In step S2008, the image processing apparatus 300 acquires in advance the wireless parameters of the destination necessary to effect a wireless connection to a device provided with a wireless communication capability like the image sensing apparatus 500, and the wireless parameters thus acquired are stored in the system controller 350 internal memory and/or the memory 352 and/or the nonvolatile memory 354 inside the image sensing apparatus 500. The recording medium 200 may be used to exchange information when acquiring the wireless parameters. In addition, the wireless parameter acquisition exchange may be carried out using a wire interface such as a USB2 or the like, not shown, and connecting the image processing apparatus 300 and the image sensing apparatus 500 with a cable. The image processing apparatus 300 uses the stored wireless parameters when establishing a wireless connection with the image sensing apparatus 500 or other such device provided with a wireless communication capability.

Once the connection registration process is finished, the routine returns to step S2002.

On the other hand, if the connection registration (pairing) button has not been pressed (NO in step S2007), the routine proceeds to step S2009. In step S2009, the system controller 350 determines whether or not the communication start button included in the operation unit 362 has been pressed in order to establish a wireless connection. If the communication start button has not been pressed, the routine returns to step S2002.

If the communication start button has been pressed, the system controller 350, through the communication circuit 330, the antenna 332, the antenna 112 and the communication circuit 110, performs a connection establishment process for establishing a state of communication with the image sensing apparatus 500 (step S2010). If communication with the image sensing apparatus 500 is not established (NO in step S2011), the system controller provides a predetermined warning with image and/or sound using the notification unit 360 and/or the image display unit 324 (step S2012), after which it proceeds to step S2020.

On the other hand, if communication with the image sensing apparatus 500 is established (YES in step S2011), then the system controller 350 receives the operating mode of the image sensing apparatus 500 (step S2013) via the communication circuit 110, the antenna 112, the antenna 332 and the communication circuit 330.

In step S2014, if the operating mode received from the image sensing apparatus 500 is the still image sensing mode, then the system controller 350 executes a simultaneous image sensing and transfer process (step S2015). The simultaneous image sensing and transfer process performed in step S2015 is described in detail later using FIG. 24. Once the simultaneous image sensing and transfer process is finished, the routine proceeds to step S2020. On the other hand, if the received operating mode of the image sensing apparatus 500 is the playback mode, then the routine proceeds to step S2016. In step S2016, the system controller 350 provides a display (a camera window) for operating the image sensing apparatus 500 using the notification unit 360 and stands by to receive selection of a control mode for controlling the image sensing apparatus 500 using the operation unit 362.

Then, in step S2017, if the control mode that is inputted using the operation unit 362 is "PC Direct Transfer Mode (DT)", the system controller 350 executes a PC direct reception process (step S2018). The PC direct reception process of step S2018 is described in detail later using FIG. 25. Once the PC direct reception process is finished, the routine proceeds to step S2020.

On the other hand, if the control mode that is inputted using the operation unit 362 is a "Remote Capture Mode (RC)", then the system controller 350 executes a remote capture control process (step S2019). The remote capture control process of step S2019 is described in detail later using FIG. 26. Once the remote capture control process is finished, the routine proceeds to step S2020.

In step S2020, the system controller 350 determines whether or not the communication end button that is included in the operation unit 362 has been pressed for severing wireless connection. If the communication end button has not been pressed, the routine returns to step S2002. If the communication end button has been pressed, the system controller 350 performs a process of severing the wireless connection with the image sensing apparatus 500 via the communication circuit 330, the antenna 332, the antenna 112 and the communication circuit 110 (step S2021), and the routine returns to step S2002.

Figure 24:
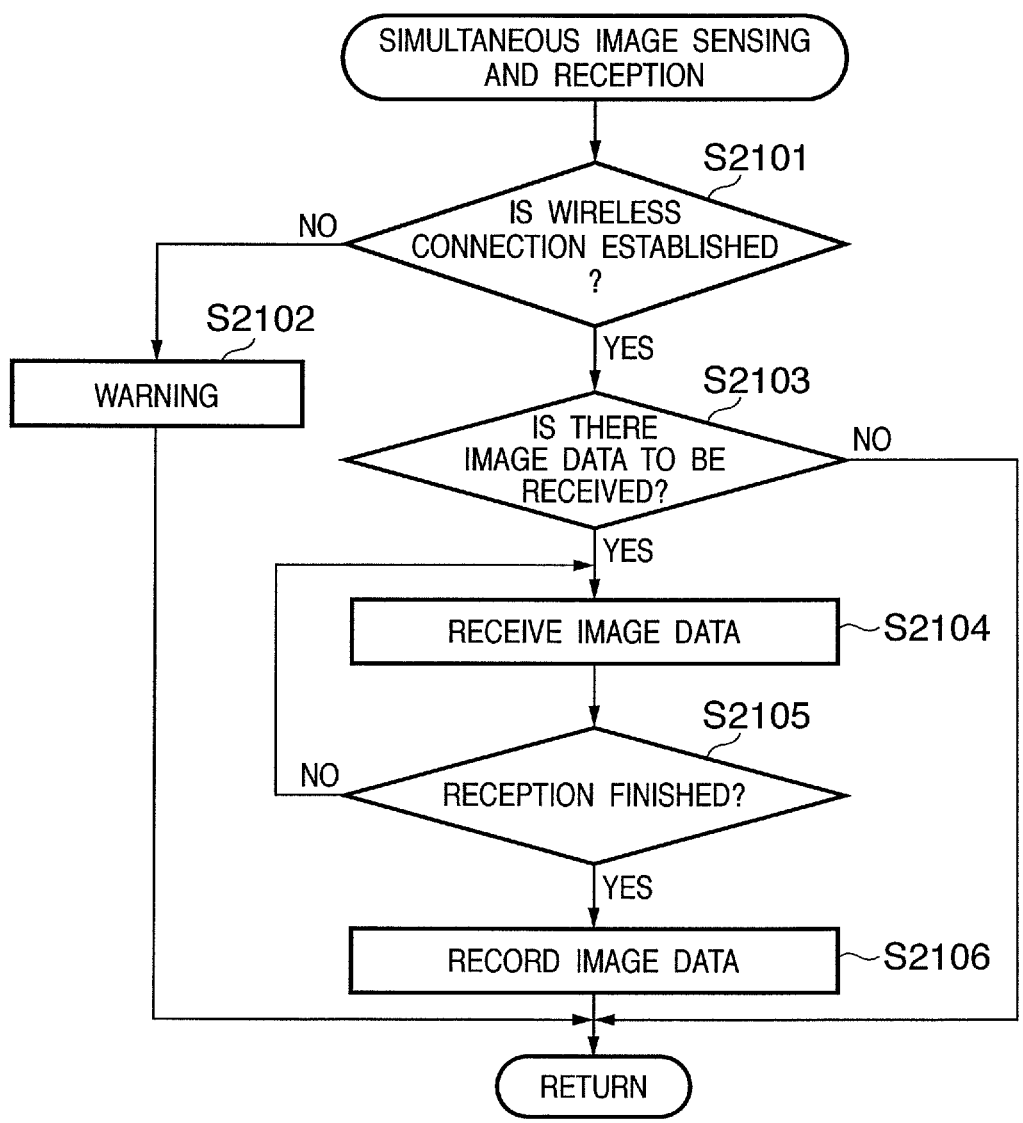
FIG. 24 is a flow chart illustrating of a simultaneous image sensing and reception processing routine of the image processing apparatus according to the fifth embodiment of the present invention.

FIG. 24 is a flow chart illustrating in detail the simultaneous image sensing and transfer process of step S2015 shown in FIG. 23.

First, the system controller 350 confirms the state of communication with the image sensing apparatus 500 through the communication circuit 330, the antenna 332, the antenna 112 and the communication circuit 110 (step S2101). If a wireless connection with the image sensing apparatus 500 has not been established, the system controller 350 provides a predetermined warning with an image and/or sound using the notification unit 360 and/or the image display unit 324 (step S2102). Then, the simultaneous image sensing and transfer process routine (step S2015) is ended. On the other hand, if a wireless connection has been established (YES in step S2101), the routine proceeds to step S2103.

In step S2103, the system controller 350 determines whether or not image data is to be transmitted from the image sensing apparatus 500 to the image processing apparatus 300 via the communication circuit 110, the antenna 112, the antenna 332 and the communication circuit 330. If there is no image data to be transferred (NO in step S2103), the simultaneous image sensing and transfer process routine is ended (step S2105).

If there is image data to be received (YES in step S2103), the system controller 350 receives the image data from the image sensing apparatus 500 via the communication circuit 110, the antenna 112, the antenna 332 and the communication circuit 330 and saves it in the memory 320 (step S2104). Once the reception of image data from the image sensing apparatus 500 is finished (YES in step S2105), the routine proceeds to step S2106. Then, the system controller 350 records the image data received from the image sensing apparatus 500 and stored in the memory 320 on the recording medium 200 through the interface 390 and the connector 392. Once recording is finished, the simultaneous image sensing and transfer process routine (step S2015) is ended.

Figure 25:
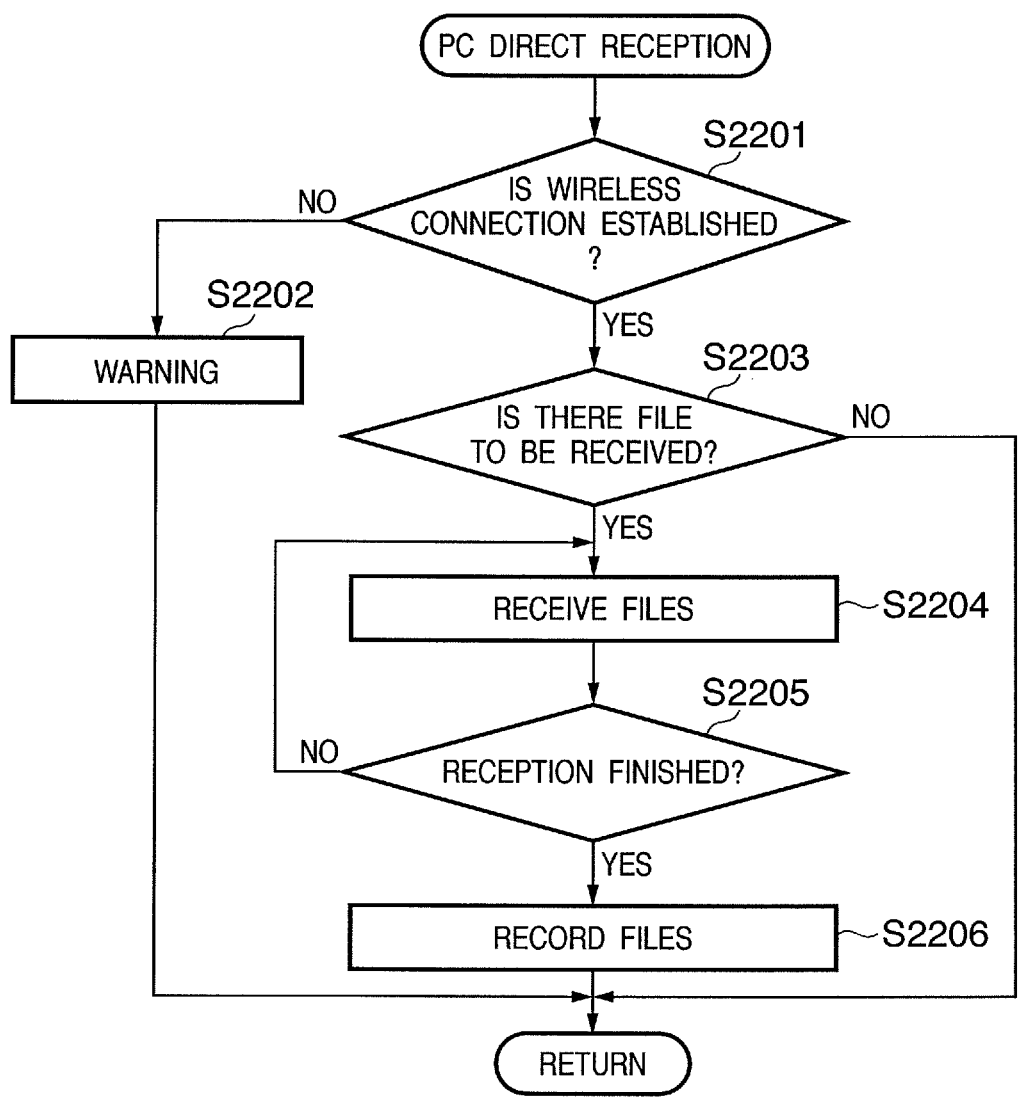
FIG. 25 is a flow chart illustrating a PC direct reception processing routine of the image processing apparatus according to the fifth embodiment of the present invention.

Next, a detailed description is given of the PC direct reception process performed in step S2018 shown in FIG. 23, with reference to the flow chart shown in FIG. 25.

First, the system controller 350 confirms the state of communication with the image sensing apparatus 500 via the communication circuit 330, the antenna 332, the antenna 112 and the communication circuit 110 (step S2201). If a wireless connection with the image sensing apparatus 500 has not been established, the system controller 350 provides a predetermined warning with image and/or sound using the notification unit 360 and/or the image display unit 324 (step S2202). Then, the PC direct reception process (step S2018) is ended. On the other hand, if a wireless connection has been established, the routine proceeds to step S2203.

In step S2203, the system controller 350 determines whether or not there is a file/files such as image data and the like to be transmitted from the image sensing apparatus 500 to the image processing apparatus 300 via the communication circuit 110, the antenna 112, the antenna 332 and the communication circuit 330. If there is no file such as image data or the like to be received (NO in step S2203), the PC direct reception processing routine (step S2018) is ended.

If there is a file/files such as image data or the like to be received (YES in step S2203), the routine proceeds to step S2204. In step S2204, the system controller 350 receives the file/files such as image data or the like from the image sensing apparatus 500 via the communication circuit 110, the antenna 112, the antenna 332 and the communication circuit 330 and saves the file/files such as image data or the like in the memory 320. Once reception of the file/files such as image data or the like is finished (YES in step S2205), the routine proceeds to step S2206. In step S2206, the system controller 350 records the file/files such as image data or the like received from the image sensing apparatus 500 that are stored in the memory 320 on the recording medium 200 through the interface 390 and the connector 392. Once recording is finished, the PC direct reception processing routine (step S2018) is ended.

Figure 26:
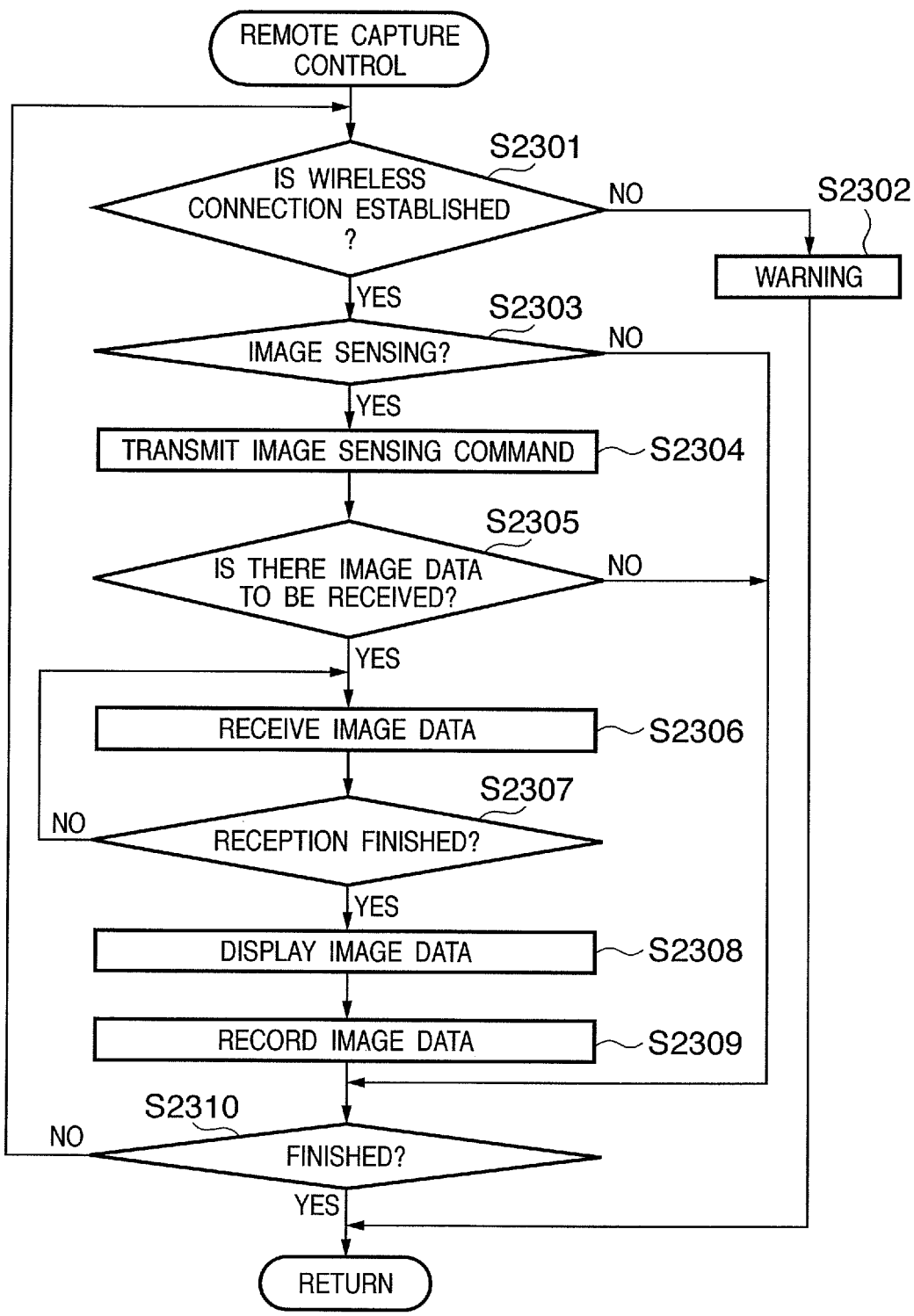
FIG. 26 is a flow chart illustrating a remote capture control processing routine of the image processing apparatus according to the fifth embodiment of the present invention.

Next, a detailed description is given of the remote capture control process performed in step S2019 shown in FIG. 23, with reference to the flow chart shown in FIG. 26.

First, the system controller 350 confirms the state of communication with the image sensing apparatus 500 through the communication circuit 330, the antenna 332, the antenna 112 and the communication circuit 110 (step S2301). If a wireless connection with the image sensing apparatus 500 has not been established, the system controller 350 provides a predetermined warning with image and/or sound using the notification unit 360 and/or the image display unit 324 (step S2302). The remote capture control process (step S2019) is then ended. On the other hand, if a wireless connection has been established, the routine proceeds to step S2303.

In step S2303, the system controller 350 provides a display (a camera window) for operating the image sensing apparatus 500 using the notification unit 360, and determines whether or not an instruction to execute remote capture image sensing with the image sensing apparatus 500 has been inputted using the operation unit 362. If an instruction to execute remote capture image sensing has not been inputted, the routine proceeds to step S2310.

If an instruction to carry out remote capture image sensing, the system controller 350 transmits an image sensing command to the image sensing apparatus 500 via the communication circuit 330, the antenna 332, the antenna 112 and the communication circuit 110 (step S2304), and the routine proceeds to step S2305.

In step S2305, the system controller 350 determines whether or not image data is to be transmitted from the image sensing apparatus 500 to the image processing apparatus 300 via the communication circuit 110, the antenna 112, the antenna 332 and the communication circuit 330. If there is no image data to be received (NO in step S2305), the routine proceeds to step S2310.

If there is image data to be received (YES in step S2305), the system controller 350 receives the image data from the image sensing apparatus 500 via the communication circuit 110, the antenna 112, the antenna 332 and the communication circuit 330 and saves the image data in the memory 320 (step S2306). Once reception of the image data from the image sensing apparatus 500 is finished (YES in step S2307), the system controller 350 displays the image data received from the image sensing apparatus 500 and stored in the memory 320 on the image display unit 324 (step S2308).

Further, the system controller 350 records the image data received from the image sensing apparatus 500 and stored in the memory 320 on the recording medium 200 through the interface 390 and the connector 392 (step S2309). Once recording is finished, the routine proceeds to step S2310.

In step S2310, the system controller 50 determines whether or not an instruction that ends the remote capture process has been inputted from the operation unit 362. If no instruction has been inputted, the routine returns to step S2301. If an instruction has been inputted, the remote capture control processing routine (step S2019) is ended.

Other Embodiments

The foregoing embodiments are described as a combination of a single image sensing apparatus 100 or 500 and a single image processing apparatus 300. However, the present invention is not limited thereto, and alternatively, may be configured as an image sensing system that combines one or any number of image sensing apparatuses and one or any number of image processing apparatuses.

In addition, although the recording medium 200 is described as separate from the image processing apparatus 300 but connectible at will thereto, alternatively, of course, the recording medium 200 may remain fixedly attached to the image processing apparatus 300.

Furthermore, the invention can be implemented by supplying a software program, which implements the functions of the foregoing embodiments directly or indirectly to a system or apparatus, reading the supplied program code with a computer of the system or apparatus, and then executing the program code. In this case, so long as the system or apparatus has the functions of the program, the mode of implementation need not rely on a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system. Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a ha rd disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory providing a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-265946, filed Sep. 13, 2005, which is hereby incorporated by reference herein in its entirety.

What is claimed is:

1. An image sensing apparatus that receives input from a user via an operation unit and that has a power saving mode for stopping the supply of electrical power to at least a part of said image sensing apparatus if no input to the operation unit is performed for a predetermined time period, said image sensing apparatus comprising:

a communication unit configured to communicate with an external processing apparatus;

an operation mode selection unit that selects one of a plurality of operation modes including at least an image sensing mode and a playback mode, wherein the image sensing mode is a mode in which said image sensing apparatus is capable of sensing light and storing in a memory an image based upon the sensing; and a control unit that controls a shift to the power saving mode of said image sensing apparatus during a time in which said image sensing apparatus is communicating with the external processing apparatus, wherein, in a case where the image sensing mode is selected by said operation mode selection unit, (a) said control unit controls said image sensing apparatus to shift to the power saving mode after the predetermined time period without any input to the operation unit if it is determined that communication by said communication unit with the external processing apparatus is not being made, and (b) said control unit controls said image sensing apparatus to prevent shift to the power saving mode after the predetermined time period without any input to the operation unit if it is determined that communication by said communication unit with the external processing apparatus is being made, and wherein in a case where the playback mode is selected by said operation mode selection unit, said control unit controls said image sensing apparatus to shift to the power saving mode after the predetermined time period without any input to the operation unit in accordance with the power saving mode being selected.

2. The image sensing apparatus according to claim 1, wherein said power saving mode stops said supply of electrical power to at least a part of said image sensing apparatus if said communication is severed, and if no input to said operation unit is performed for the predetermined time period.

3. The image sensing apparatus according to claim 1, wherein said communication unit is a unit that carries out wireless communication.

4. The image sensing apparatus according to claim 1, further comprising a determination unit that determines whether or not said communication unit is transmitting data to the external processing apparatus with which said image sensing apparatus communicates.

5. The image sensing apparatus according to claim 1, wherein said image sensing apparatus has a remote capture mode in which said image sensing apparatus performs focus control, photometry, and image sensing in accordance with an image sensing command received from the external processing apparatus.

6. The image sensing apparatus according to claim 1, wherein the image sensing apparatus is a digital camera.

7. The image sensing apparatus according to claim 1, wherein the image sensing apparatus is a mobile phone with an image sensing unit.

8. The image sensing apparatus according to claim 1, wherein the communication unit communicates with the external processing apparatus using a wireless LAN or Bluetooth.

9. The image sensing apparatus according to claim 1, wherein the external processing apparatus is capable of performing long-distance wireless communication and short-range wireless communication other than the long-distance wireless communication, and the communication unit communicates with the external processing apparatus using the short-range wireless communication.

10. A control method for an image sensing apparatus provided with a communication unit that communicates with an external processing apparatus and an operation unit that receives input from a user, and having a power saving mode for stopping the supply of electrical power to at least a part of the image sensing apparatus if no input to the operation unit is performed for a predetermined time period, said control method comprising:

an operation mode selection step of selecting one of a plurality of operation modes including at least an image sensing mode and a playback mode, wherein the image sensing mode is a mode in which the image sensing apparatus is capable of sensing light and storing in a memory an image based upon the sensing;

a step of, in a case where the image sensing mode is selected in said operation mode selection step, (a) shifting the image sensing apparatus to the power saving mode after the predetermined time period without any input to the operation unit if it is determined that communication by the communication unit with the external processing apparatus is not being made, and (b) preventing shift to the power saving mode after the predetermined time period without any input to the operation unit if it is determined that communication by the communication unit with the external processing apparatus is being made; and a step of, in a case where the playback mode is selected by said operation mode selection step, shifting the image sensing apparatus to the power saving mode after the predetermined time period without any input to the operation unit in accordance with the power saving mode being selected.

11. The control method according to claim 10 further comprising a step of stopping said supply of electrical power to at least a part of said image sensing apparatus if said communication is severed, and if no input to said operation unit is performed for the predetermined time period.

12. The control method according to claim 10, wherein the communication unit is a unit that carries out wireless communication.

13. An image processing apparatus-readable storage medium storing a program executable by said image processing apparatus having program code for implementing the control method according to claim 10.

14. The control method according to claim 10, further comprising a determination step of determining whether or not the communication unit is transmitting data to the external processing device with which the image sensing apparatus communicates.

* * * * *